(12) United States Patent
Horn

(10) Patent No.: US 8,792,392 B2
(45) Date of Patent: Jul. 29, 2014

(54) METHOD AND APPARATUS FOR IN-BAND PROVISIONING OF A DEVICE AT A CLOSED SUBSCRIBER GROUP

(75) Inventor: Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 13/022,218

(22) Filed: Feb. 7, 2011

(65) Prior Publication Data

US 2012/0033679 A1 Feb. 9, 2012

Related U.S. Application Data

(60) Provisional application No. 61/303,247, filed on Feb. 10, 2010.

(51) Int. Cl.
  *H04L 12/16* (2006.01)
  *H04L 12/28* (2006.01)

(52) U.S. Cl.
  USPC .......................................... 370/259; 370/401

(58) Field of Classification Search
  None
  See application file for complete search history.

(56) References Cited

U.S. PATENT DOCUMENTS

| 7,743,094 | B2 * | 6/2010 | Metke et al. ................... 709/203 |
| 8,265,033 | B2 * | 9/2012 | Gunnarsson et al. ......... 370/331 |
| 2004/0111520 | A1 * | 6/2004 | Krantz et al. .................. 709/229 |
| 2005/0198534 | A1 | 9/2005 | Matta et al. |
| 2006/0190991 | A1 | 8/2006 | Iyer |
| 2007/0248064 | A1 * | 10/2007 | Shaheen ....................... 370/338 |
| 2007/0255837 | A1 | 11/2007 | Hassan et al. |
| 2008/0065746 | A1 | 3/2008 | Moghaddam et al. |
| 2008/0072292 | A1 | 3/2008 | Narjala |
| 2008/0318575 | A1 * | 12/2008 | Ulupinar et al. .............. 455/436 |
| 2009/0042576 | A1 * | 2/2009 | Mukherjee et al. ........... 455/436 |
| 2009/0047968 | A1 * | 2/2009 | Gunnarsson et al. ......... 455/446 |
| 2009/0070694 | A1 * | 3/2009 | Ore et al. ...................... 715/764 |
| 2009/0093232 | A1 | 4/2009 | Gupta et al. |
| 2009/0232019 | A1 | 9/2009 | Gupta et al. |
| 2009/0264095 | A1 * | 10/2009 | Khetawat et al. .......... 455/404.2 |
| 2009/0270092 | A1 * | 10/2009 | Buckley et al. ............... 455/434 |

(Continued)

FOREIGN PATENT DOCUMENTS

| JP | 2006509385 A | 3/2006 |
| JP | 2008545290 A | 12/2008 |

(Continued)

OTHER PUBLICATIONS

International Search Report and Written Opinion—PCT/US2011/024409—ISA EPO—Aug. 3, 2011.

(Continued)

*Primary Examiner* — Hassan Phillips
*Assistant Examiner* — Hicham Foud
(74) *Attorney, Agent, or Firm* — François A. Pelaez

(57) ABSTRACT

Methods and apparatuses are provided that facilitate performing in-band provisioning for one or more devices at a restricted group of network nodes. A packet data context related to performing provisioning at the restricted group can be established between a device and a network via a restricted group node. The device can request provisioning at the restricted group using the packet data context, and the network can perform the provisioning. The packet data context can restrict access to allow provisioning related communications while rejecting other communications until provisioning is complete.

50 Claims, 18 Drawing Sheets

(56) References Cited

U.S. PATENT DOCUMENTS

| | | | |
|---|---|---|---|
| 2009/0305699 A1 | | 12/2009 | Deshpande et al. |
| 2010/0157850 A1* | | 6/2010 | Horn et al. .................. 370/259 |
| 2010/0159899 A1* | | 6/2010 | Horn et al. ................ 455/414.1 |
| 2012/0178416 A1* | | 7/2012 | Miklos et al. ................ 455/410 |

FOREIGN PATENT DOCUMENTS

| | | |
|---|---|---|
| JP | 2009081868 A | 4/2009 |
| WO | WO-2004049664 A2 | 6/2004 |
| WO | WO-2006136890 A2 | 12/2006 |
| WO | WO2008133561 A1 | 11/2008 |
| WO | WO2010075472 | 7/2010 |

OTHER PUBLICATIONS

LG Electronics : "Clarification on TEID usage",3GPP Draft;S2-096568-23401-CR1381-TEID-CLARIF, 3rdGeneration Partnership Project (3GPP),Mobile Competence Centre ; 650, Route Deslucioles ; F-06921 Sophia-Antipolis Edex ; France,no. Cabo; Nov. 16, 2009,XP050397511,[ retrieved on Nov. 10, 2009].

Qualcomm Europe: "Provisioning of a UEs white list for CSG Cells" 3GPP Draft; C1_083102, 3rd Generation Partnership Project (3GPP), Mobile Competence Centre ; 650, Route Des Lucioles ; F-06921 Sophia-Antipolis Cedex ; France, no. Budapest, Hungary; Aug. 11, 2008, XP050308779 [retrieved on Aug. 11, 2008] the whole document.

Taiwan Search Report—TW100104450—TIPO—Jul. 19, 2013.

* cited by examiner

METHOD AND APPARATUS FOR IN-BAND PROVISIONING OF A DEVICE AT A CLOSED SUBSCRIBER GROUP

CLAIM OF PRIORITY UNDER 35 U.S.C. §119

The present application for patent claims priority to Provisional Application No. 61/303,247 entitled "METHOD AND APPARATUS TO ENABLE PROVISIONING OF A USER AT A CLOSED SUBSCRIBER GROUP" filed Feb. 10, 2010, and assigned to the assignee hereof and hereby expressly incorporated by reference herein.

BACKGROUND

1. Field

The following description relates generally to wireless network communications, and more particularly to communicating with nodes of a closed subscriber group (CSG).

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional base stations can be deployed to provide more robust wireless coverage to mobile devices. For example, wireless relay stations and low power base stations (e.g., which can be commonly referred to as access point base stations, Home NodeBs or Home evolved NodeBs (H(e)NB), femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator's network via broadband connection (e.g., digital subscriber line (DSL) router, cable or other modem, etc.). Some H(e)NBs provide closed subscriber group (CSG) access that restricts access to certain devices or related users that are members of the CSG. Currently, a device can be provisioned on a CSG using one or more out-of-band procedures, meaning procedures that occur regardless of a connection between the device and one or more nodes of the CSG (e.g., manually adding the device to a member list at a node of the CSG, manually adding the CSG H(e)NB to a list of access points accessible by the device, etc.). The device can subsequently communicate with, reselect to, etc., H(e)NBs in the CSG.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with providing in-band provisioning for one or more devices to a restricted group of nodes. For example, a device can request and receive access from one or more nodes in a restricted group, such as a closed subscriber group (CSG), for the purpose of provisioning the device at the restricted group. For example, the device can request establishment of a provisioning connection, which can relate to a packet data context as described herein. A provisioning connection can be established that allows at least some level of temporary access utilized for the purpose of provisioning at the restricted group, without providing other access to the device. Where provisioning is successfully completed, the provisioning connection can be terminated, and the device can receive additional access from the one or more nodes of the restricted group.

According to an example, a method for facilitating in-band CSG provisioning is provided including receiving a request from a device to establish a packet data context for an access point name and determining that the device is requesting CSG provisioning based on the request. The method further includes selecting a gateway for establishing the packet data context based at least in part on the access point name and sending a session request message to the gateway to establish the packet data context for the device.

In another aspect, an apparatus for facilitating in-band CSG provisioning is provided that includes at least one processor configured to receive a request from a device to establish a packet data context for an access point name and determine that the device is requesting CSG provisioning based on the request. The at least one processor is further configured to select a gateway for establishing the packet data context based at least in part on the access point name and send a session request message to the gateway to establish the packet data context for the device. In addition, the apparatus includes a memory coupled to the at least one processor.

In yet another aspect, an apparatus for facilitating in-band CSG provisioning is provided that includes means for determining that a device is requesting CSG provisioning based on a request from the device to establish a packet data context for an access point name and means for selecting a gateway for establishing the packet data context based at least in part on the access point name. The apparatus further includes means for sending a session request message to the gateway to establish the packet data context for the device.

Still, in another aspect, a computer-program product for facilitating in-band CSG provisioning is provided including a computer-readable medium having code for causing at least one computer to receive a request from a device to establish a packet data context for an access point name and code for causing the at least one computer to determine that the device is requesting CSG provisioning based on the request. The computer-readable medium further includes code for causing the at least one computer to select a gateway for establishing the packet data context based at least in part on the access point name and code for causing the at least one computer to send a session request message to the gateway to establish the packet data context for the device.

Moreover, in an aspect, an apparatus for facilitating in-band CSG provisioning is provided that includes a provisioning support indicating component for determining that a device is requesting CSG provisioning based on a request from the device to establish a packet data context for an access point name. The apparatus further includes a gateway selecting component for selecting a gateway for establishing the packet data context based at least in part on the access point name and a packet data context establishing component for sending a session request message to the gateway to establish the packet data context for the device.

According to another example, a method for provisioning a CSG is provided that includes receiving an indication that provisioning is supported for a CSG and transmitting a request to establish a packet data context for an access point name including an indication for CSG provisioning.

In another aspect, an apparatus for provisioning a CSG is provided that includes at least one processor configured to receive an indication that provisioning is supported for a CSG. The at least one processor is further configured to transmit a request to establish a packet data context for an access point name including a different indication for CSG provisioning. In addition, the apparatus includes a memory coupled to the at least one processor.

In yet another aspect, an apparatus for provisioning a CSG is provided that includes means for receiving an indication that provisioning is supported for a CSG. The apparatus further includes means for transmitting a request to establish a packet data context for an access point name including a different indication for CSG provisioning.

Still, in another aspect, a computer-program product for provisioning a CSG is provided including a computer-readable medium having code for causing at least one computer to receive an indication that provisioning is supported for a CSG. The computer-readable medium further includes code for causing the at least one computer to transmit a request to establish a packet data context for an access point name including a different indication for CSG provisioning.

Moreover, in an aspect, an apparatus for provisioning a CSG is provided that includes a provisioning support determining component for receiving an indication that provisioning is supported for a CSG. The apparatus further includes a packet data context requesting component for transmitting a request to establish a packet data context for an access point name including a different indication for CSG provisioning.

In another example, a method for provisioning a CSG is provided including receiving a session request message to establish a packet data context for CSG provisioning at a device. The method further includes sending a response message indicating establishment of the packet data context and filtering one or more packets associated with the device based at least in part on determining whether the one more packets are related to CSG provisioning.

In another aspect, an apparatus for provisioning a CSG is provided that includes at least one processor configured to receive a session request message to establish a packet data context for CSG provisioning at a device and send a response message indicating establishment of the packet data context. The at least one processor is further configured to filter one or more packets associated with the device based at least in part on determining whether the one or more packets are related to CSG provisioning. In addition, the apparatus includes a memory coupled to the at least one processor.

In yet another aspect, an apparatus for provisioning a CSG is provided that includes means for receiving a session request message to establish a packet data context for CSG provisioning at a device and sending a response message indicating establishment of the packet data context. The apparatus further includes means for filtering one or more packets associated with the device based at least in part on determining whether the one or more packets are related to CSG provisioning.

Still, in another aspect, a computer-program product for provisioning a CSG is provided including a computer-readable medium having code for causing at least one computer to receive a session request message to establish a packet data context for CSG provisioning at a device and code for causing the at least one computer to send a response message indicating establishment of the packet data context. The computer-readable medium further includes code for causing the at least one computer to filter one or more packets associated with the device based at least in part on determining whether the one or more packets are related to CSG provisioning.

Moreover, in an aspect, an apparatus for provisioning a CSG is provided that includes a packet data context establishing component for receiving a session request message to establish a packet data context for CSG provisioning at a device and sending a response message indicating establishment of the packet data context. The apparatus further includes a packet filtering component for filtering one or more packets associated with the device based at least in part on determining whether the one or more packets are related to CSG provisioning.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
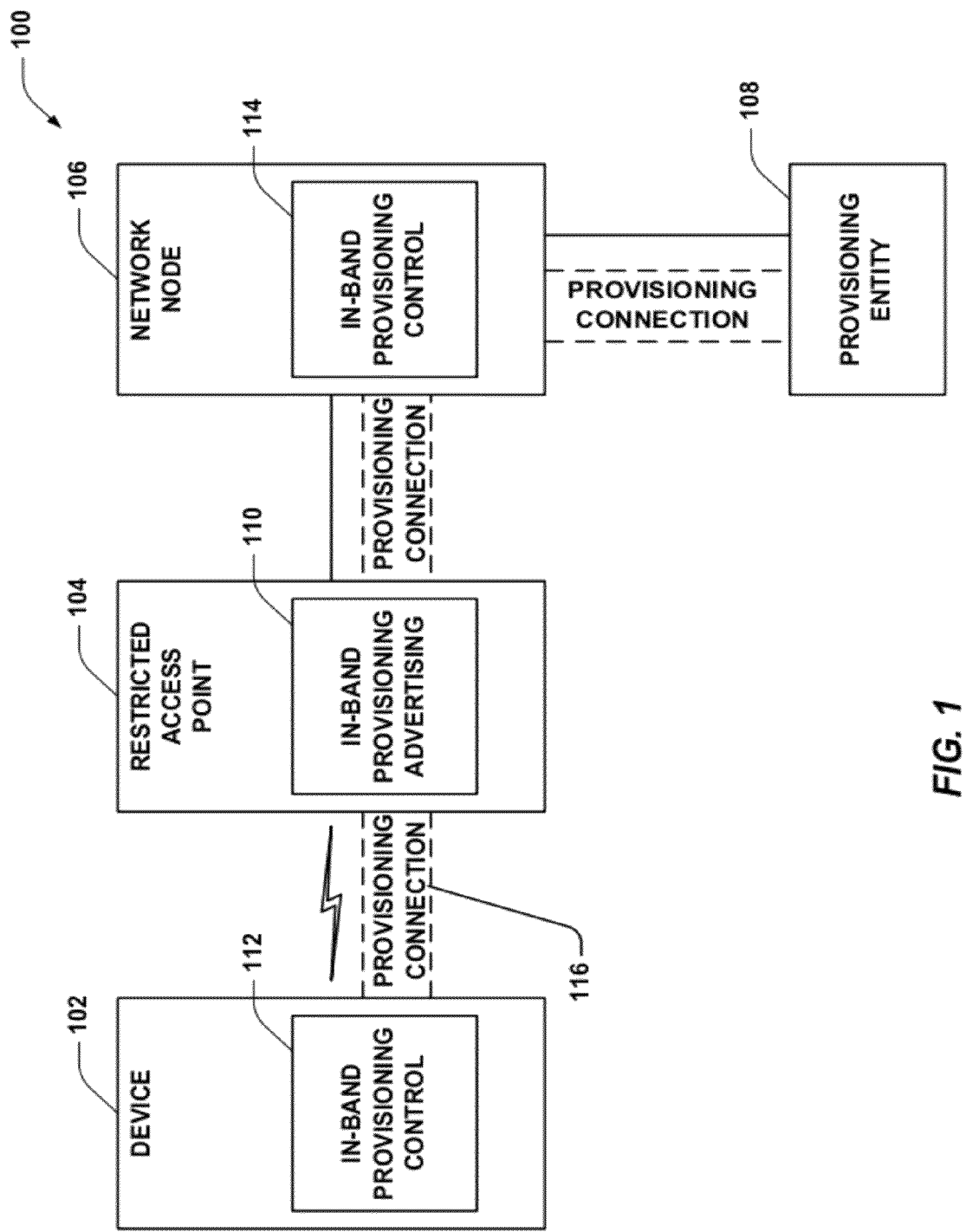
FIG. 1 illustrates an example system for performing in-band provisioning at a restricted group.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, in-band provisioning at a restricted group of nodes is provided allowing devices to establish at least a temporary connection with one or more of the restricted group of nodes (e.g., one or more access points) for initiating registration thereto. In-band provisioning can refer to establishing a connection with a node in the restricted group to perform provisioning for accessing nodes in the restricted group, as opposed to out-of-band procedures that are performed regardless of a device connection with one or more nodes in the restricted group. For example, a device can communicate with one or more nodes over the connection for provisioning for communication at the restricted group. The provisioning can include network nodes communicating with a provisioning entity or one or more other nodes that allow the device to register with the restricted group. In this regard, a device need not be provisioned to the restricted group using out-of-band procedures, which oftentimes cannot be performed by the device and can require a separate connection to one or more nodes related to the restricted group. Allowing in-band provisioning can be beneficial, for example, for access points of a restricted group employed in public places, such as airports, hotels, restaurants, etc., and/or in other situations where providing one or more user-specific or user-selected levels of access is desired.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1 illustrated are several nodes of a sample communication system 100 (e.g., a portion of a communication network). For illustration purposes, various aspects are described in the context of one or more devices, access points, and network nodes that communicate with one another. It is to be appreciated, however, that the teachings herein can be applicable to other types of apparatuses or other similar apparatuses that are referenced using other terminology. For example, in various implementations access points can be referred to or implemented as base stations, NodeBs, eNodeBs, Home NodeBs and Home eNBs (collectively referred to as H(e)NBs), etc., while devices can be referred to or implemented as user equipment (UE), access terminals, mobiles, and so on.

Access points in the system 100 provide one or more services (e.g., network connectivity) for one or more wireless terminals (e.g., device 102) that can be installed within or that can travel throughout a coverage area of the system 100. For example, at various points in time, the device 102 can connect to an access point 104 or some other access point (not shown) in the system 100. Each of the access points can communicate with one or more network nodes (represented, for explanation, by network node 106) to facilitate network connectivity (e.g., wide area network connectivity). These network nodes can take various forms such as, for example, one or more radio and/or core network entities, gateways, routers, etc. Thus, in various implementations the network node 106 can represent functionality such as at least one of: network management (e.g., via an operation, administration, management, and/or provisioning entity), call control, session management, mobility management, gateway functions, interworking functions, and/or other suitable network functionality.

The illustrated nodes of the system 100 can be configured to provide in-band provisioning to enable a device to access an otherwise restricted access point. In some aspects, the term in-band provisioning can refer to provisioning a device to access an access point when the device is in communication with the access point. Thus, in-band provisioning may be distinguished from out-of-band provisioning where the device is provisioned when the device is not in communication with the access point.

In some cases, a device can select to be provisioned at a restricted access point associated with a wireless cell set (e.g., based at least in part on a manual selection of the restricted access point indicated by a user or other subscriber of the device). In general, a wireless cell set comprises a set of one or more cells (e.g., at least one access point) where there is a defined relationship specific to that set. An example of a wireless cell set is a closed subscriber group (CSG). For convenience, the discussion that follows may simply refer to the term CSG, rather than the more general term wireless cell set. It is to be appreciated, however, that the described concepts may be applicable to other types of defined sets or groups of wireless cells or other similar entities, which can include restricted groups of wireless cells.

As described in more detail below, the access point 104 can include an in-band provisioning advertising component 110 that advertises (e.g., broadcasts) an indication that the access point 104 supports in-band provisioning. Upon receiving this indication or upon determining in some other way (e.g., via an exchange of messages or via a priori knowledge of the capabilities of access point 104 by a device) that the access point 104 supports in-band provisioning, a device that is not otherwise allowed to access the access point (e.g., the device 102) can send a request to connect to the access point 104. In this example, the device 102 can include an in-band provisioning control component 112 for performing in-band provisioning-related operations, such as sending the request and the performing the subsequent functions, as described herein. The access point 104 can inform the network node 106 of the connection request, and the network node 106 (e.g., using in-band provisioning control component 114) can establish a provisioning connection to enable the device 102 to be provisioned for access at the access point 104.

The provisioning connection can be represented by the pair of dashed lines 116 between the device 102 and the provisioning entity 108. In this example, a provisioning connection 116 can enable the device 102 to send and receive control signals. In addition, the provisioning connection 116 can enable the device 102 to send data to and receive data from the provisioning entity 108 (e.g., a CSG administration function or server), while disabling sending and receiving data to/from other endpoints.

The provisioning connection 116, for example, can provide limited access for the device 102. Specifically, in an example, a provisioning connection 116 comprises limited internet protocol (IP) connectivity that can only be used to access a provisioning entity 108. In some aspects, a provisioning connection 116 can establish connectivity to an IP network that allows a device to be provisioned to access a CSG. In one example, a packet data context can be established to a node that filters packets, allowing and/or redirecting to a provisioning entity packets related to the provisioning entity 108 (e.g., in an aspect, while rejecting other packets). For example, the packet data context can relate to a packet data protocol (PDP) context, a packet data network (PDN) connection, and/or the like. In one example of redirection, the node, which can include network node 106, can redirect hypertext transport protocol (HTTP) Get requests to a particular web page (e.g., one that allows the device to provision at the CSG), irrespective of the web page requested by a Get request from device 102.

Once the provisioning connection 116 is established, the device 102 can be prompted to send authorization information (e.g., a password, payment information, etc.) to the provisioning entity 108, which can be a CSG administration server in one example. Upon verification of the authorization information, the provisioning entity 108 can provision the device 102 to access the access point 104 and/or one or more other access points in the restricted group. For example, subscription information for the device 102 can be modified to indicate that the device is a member of a CSG or other restricted group associated with the access point 104. Consequently, the device 102 can then be provided with additional access at the access point 104 (e.g., open access or other access beyond the provisioning connection 116). Thus, the described aspects allow device 102 to establish an in-band provisioning connection 116 to obtain access to a CSG or other restricted group.

Figure 2:
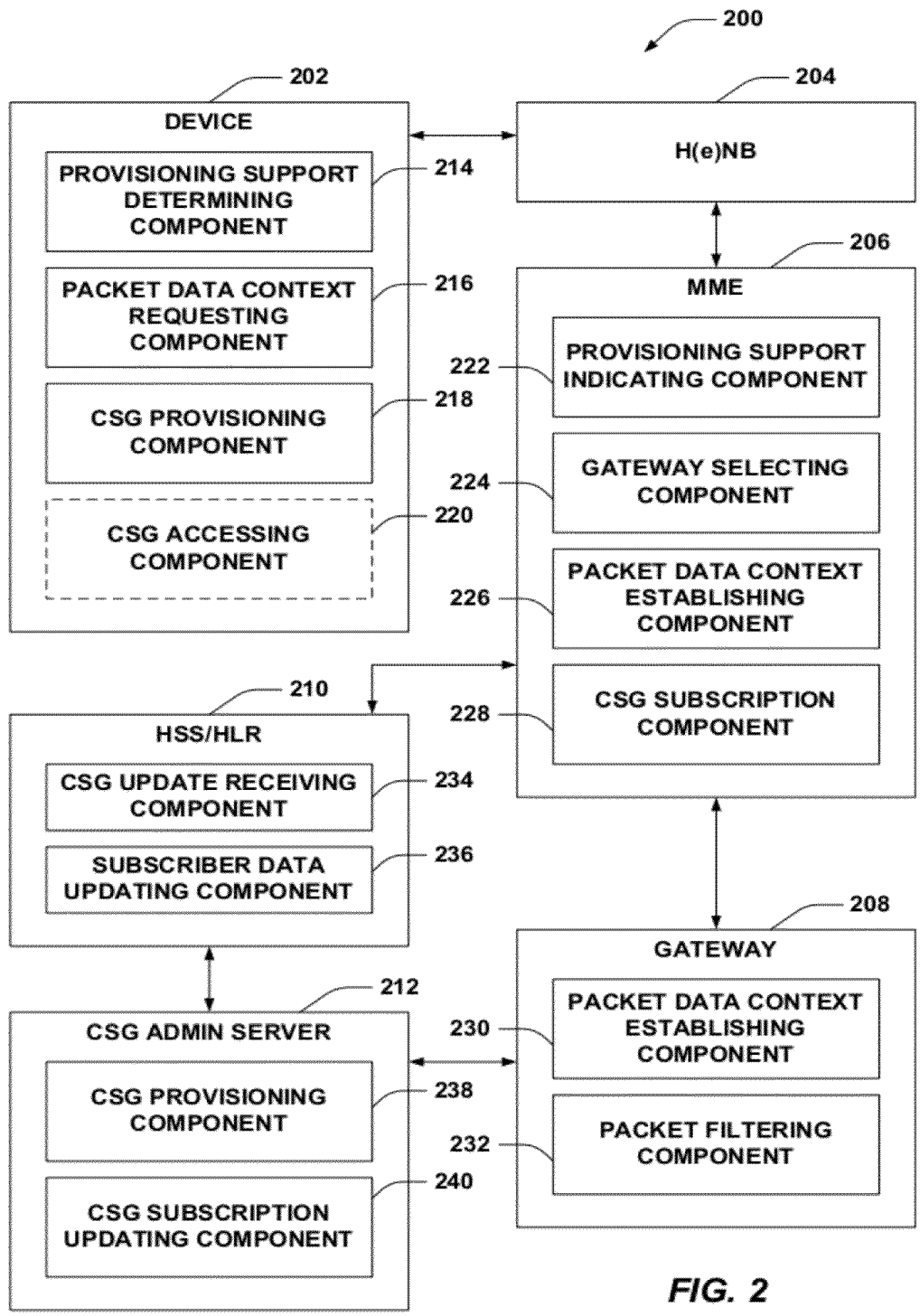
FIG. 2 illustrates an example system for facilitating performing in-band provisioning for a device at a CSG.

Turning to FIG. 2, an example wireless communication system 200 is illustrated that facilitates performing in-band provisioning at a CSG. System 200 can include a device 202 that can communicate with one or more access points to receive access to a wireless network, an H(e)NB 204 that provides restricted access to one or more devices, and a mobility management entity (MME) 206 that authorizes one or more devices to communicate with one or more core network components. System 200 can additionally comprise a gateway 208 that facilitates accessing one or more core network components, such as a home subscriber server (HSS)/home location register (HLR) 210, and a CSG administration server 212 that maintains CSG subscription information for one or more devices. In one example, device 202 can be a UE, modem (or other tethered device), a portion thereof, and/or the like, and H(e)NB 204 can be a femtocell, picocell, or similar access point, a portion thereof, etc. In addition, for example, MME 206 can additionally or alternatively be a serving general packet radio service (GPRS) support node (SGSN), gateway can be a PDN gateway (P-GW), gateway GPRS support node (GGSN), local gateway (L-GW), substantially any other gateway or router, etc. Moreover, it is to be appreciated that additional components or nodes can be present between those shown (e.g., one or more additional gateways can be present between MME 206 and gateway 208, gateway 208 and HSS/HLR 210, etc.).

Device 202 can comprise a provisioning support determining component 214 for discerning whether one or more H(e)NBs support in-band provisioning, and a packet data context requesting component 216 for transmitting a request to establish a packet data context to one or more core network nodes for requesting in-band provisioning. Device 202 also comprises a CSG provisioning component 218 for requesting in-band provisioning at a CSG, and optionally a CSG accessing component 220 for communicating in the CSG, and/or with one or more H(e)NBs thereof, to receive access beyond that provided for provisioning. MME 206 comprises a provisioning support indicating component 222 for specifying whether a CSG allows in-band provisioning, and a gateway selecting component 224 for determining a gateway to receive provisioning communications from a device requesting in-band CSG provisioning. MME 206 further comprises a packet data context establishing component 226 for initiating a packet data context between the device and the gateway, and a CSG subscription component 228 for storing CSG subscription information related to one or more devices.

Gateway 208 comprises a packet data context establishing component 230 for setting up a packet data context with a device, and a packet filtering component 232 for determining routing for one or more packets from the device. HSS/HLR 210 comprises a CSG update receiving component 234 for obtaining a request to update a CSG subscription related to a device, and a subscriber data updating component 236 for facilitating modifying CSG subscription data for the device. CSG administration server 212 comprises a CSG provisioning component 238 for initiating a CSG provisioning procedure related to a device, and a CSG subscription updating component 240 for requesting updating of a CSG subscription for a device based on the CSG provisioning procedure.

According to an example, device 202 can determine to attempt connection to H(e)NB 204 to receive access to a wireless network. For example, this can relate to manual selection of the H(e)NB 204 (e.g., a user selects and/or initiates connection to H(e)NB 204 using an interface). For example, H(e)NB 204 can be displayed in a list of surrounding access points at device 202, and an interface can determine selection of H(e)NB 204 from the list (e.g., by detecting user interaction to select H(e)NB 204, etc.). For instance, H(e)NB 204 can provide access to a CSG that device 202 may not be a member of, and thus device 202, upon encountering an identifier, CSG indicator, etc. from H(e)NB 204, and/or determining that device 202 is not a member of the CSG, device 202 may not automatically attempt connection with H(e)NB 204. Upon selection of H(e)NB 204, in the above example however, provisioning support determining component 214 can determine whether a CSG related to H(e)NB 204 supports in-band provisioning. In one example, provisioning support determining component 214 can request an attach or registration procedure with H(e)NB 204 to determine such.

For example, provisioning support determining component 214 can transmit an attach, service request, location area update (LAU), routing area update (RAU), tracking area update (TAU), or similar message to H(e)NB 204. In one example, provisioning support determining component 214 can indicate a parameter in the message that specifies the request is related to CSG provisioning (e.g., this can include setting an (evolved packet system) EPS update type to indicate CSG provisioning). H(e)NB 204 can deny the registration request, in which case provisioning support determining component 214 determines that H(e)NB 204 does not support in-band provisioning, and device 202 can attempt selecting another H(e)NB.

In another example, H(e)NB 204 can provide at least some level of service to device 202 allowing communication of the registration request message to MME 206. Provisioning support indicating component 222 can receive the registration request message and can transmit a registration accept message indicating whether CSG provisioning is supported at the CSG, or can transmit a registration deny message to device 202 via H(e)NB 204, for example. For instance, MME 206 can be associated with the CSG, and thus provisioning support indicating component 222 can specify whether the CSG allows in-band provisioning. This can be based at least in part on an operator policy for the CSG stored by provisioning support indicating component 222, for example, which can be configured at or otherwise received by MME 206. In one example, provisioning support indicating component 222 can transmit the registration accept message specifying a CSG provisioning support indicator based at least in part on whether the CSG supports in-band provisioning. The provisioning support indicator can be one or more indicators in the request accept message that specify whether in-band provisioning is supported (e.g., a bit indicator), an access level for the device 202 during provisioning (e.g., whether the device has limited or full service with the H(e)NB 204, and/or a level of limited service), and/or the like.

Provisioning support determining component 214 can receive the request accept or deny message from MME 206. Where provisioning support determining component 214 receives a registration deny message or a registration accept message with a CSG provisioning support indicator specifying that the CSG does not allow in-band provisioning, further access to H(e)NB 204 can be rejected, and/or device 202 can attempt connection to another H(e)NB. Where, however, provisioning support determining component 214 obtains a registration accept message with a CSG provisioning support indicator specifying that the CSG does allow in-band provisioning, packet data context requesting component 216 can request activation of a packet data context from MME 206 (e.g., via H(e)NB), and can specify that the request is related to CSG in-band provisioning. As described, for example, the packet data context can be a PDP context, PDN connection, and/or the like.

In another example, device 202 can determine to automatically select H(e)NB 204 (e.g., based at least in part on receiving an indicator that H(e)NB 204 supports in-band CSG provisioning, determining that device 202 has provisioned on the CSG before, etc.), and/or the like. In either case, for example, packet data context requesting component 216 can request activation of a packet data context from MME 206, and can include one or more parameters in the request to indicate the packet data context relates to CSG provisioning. For example, packet data context requesting component 216 can set an EPS request type in the request to CSG provisioning (or other parameter to indicate the packet data context request is related to CSG provisioning), set an access point name (APN) in the request to an APN related to CSG provisioning, and/or the like. Packet data context establishing component 226 can obtain the request to activate the packet data context for in-band CSG provisioning. For example, packet data context establishing component 226 can determine the request is related to CSG provisioning based at least in part on one or more parameters in the request, such as an EPS request type, on determining that an APN specified in the request is associated with CSG provisioning, and/or the like. In this regard, packet data context establishing component 226 can establish one or more data bearers for receiving communications from device 202 related to CSG provisioning. Additionally, in this regard, gateway selecting component 224 can determine one or more gateways to assist with the in-band CSG provisioning of device 202.

For example, gateway selecting component 224 can determine the one or more gateways based at least in part on a selection function, based at least in part on a CSG provisioning APN (e.g., of H(e)NB 204) or statically configured gateway indicated in the request to activate the packet data context, and/or the like. In one example, gateway selecting component 224 can utilize an APN with the gateway selection function to determine a gateway identity in a related public land mobile network (PLMN) that corresponds to the APN. For example, APNs specified in such requests can allow MMEs, such as MME 206, to determine a point of attachment in an IP network for a packet data context. Thus, the gateway selection function, for example, can include selecting a gateway from one or more mappings of APNs to gateways, which can be stored (e.g., by MME 206 or another node) for subsequent association and retrieval, based at least in part on the APN. For example, packet data context requesting component 216 can include an APN in the request, which can relate to specifying CSG provisioning, and gateway selecting component 224 can determine to utilize gateway 208 to provide in-band provisioning support for device 202 based at least in part on the APN. In addition, gateway selecting component 224 can determine an IP address, fully qualified domain name (FQDN), etc. of the gateway 208 based at least in part on a determined gateway identity. For example, this can include performing a domain name server (DNS) query for the gateway with a DNS server based on the determined gateway identity. In another example, the request can include the address of the gateway 208 (e.g., as determined by device 202 from H(e)NB 204, populated in the request or a related message by H(e)NB 204, and/or the like).

In this example, packet data context establishing component 226 can request establishment of a packet data context with gateway 208, which can include sending a session request message, such as a create session request message to establish a PDN connection, a create PDP context request message to establish a PDP context, and/or a similar message. Packet data context establishing component 230 can receive the request and accordingly establish the packet data context (e.g., the associated PDP context or PDN connection). For example, packet data context establishing component 230 can transmit a response message indicating successful (or failed) establishment of the packet data context; this can include a create session response message to establish the PDN connection, a create PDP context response message to establish the PDP context, and/or a similar message. Where packet data context establishment is successful, for example, packet data context establishing component 226 can establish a communication tunnel between the H(e)NB 204 and the gateway 208 for forwarding communications from device 202 related to the packet data context to the gateway 208. In this regard, though not shown, H(e)NB 204 can be additionally or alternatively coupled directly to gateway 208. Packet data context establishing component 226 can additionally create a radio bearer between device 202 and H(e)NB 204 that can be used for communications related to the tunnel. H(e)NB 204, in this regard, can associate the radio bearer with device 202 to the tunnel for forwarding related communications.

In addition, packet data context establishing component 226 can notify device 202 of the established packet data context (or related bearers), and packet data context requesting component 216 can receive the notification from MME 206. In this regard, CSG provisioning component 218 can begin communicating using the packet data context to perform in-band CSG provisioning. In another example, gateway selecting component 224 can deactivate access to one or more other gateways to ensure device 202 is allowed to communicate for provisioning access, but not allowed access for other communications. Moreover, packet data context establishing component 226 can indicate to gateway 208 that device 202 is to be allowed access for the purposes of provisioning. For example, this can be part of the session request message (e.g., a parameter thereof), a separate message, and/or the like. Packet data context establishing component 230 can receive this indication, and packet filtering component 232 can accordingly allow provisioning packets from device 202, while rejecting any packets related to other entities or data types, as described below.

For example, CSG provisioning component 218 can communicate with CSG administration server 212 by utilizing the one or more bearers for communicating with gateway 208 over a tunnel corresponding to the packet data context; an identity or address of the CSG administration server 212 can be provided to the device 202 by H(e)NB 204, for instance. In one specific example, device 202 can launch a web browser once connected to H(e)NB 204 for CSG provisioning, and can be redirected to a web page on CSG administration server 212 by H(e)NB 204 or gateway 208. Thus, CSG provisioning component 218 can transmit data to the CSG administration server 212 requesting access thereto over the one or more data bearers. The data, for example, can include an indicator of agreement to terms and conditions, login or account information (e.g., user name/password), billing or payment information, (e.g., credit card number, billing address, etc.) and/or similar information that can be received from a user interface. The data can additionally or alternatively include data stored on the device, such as subscriber or operator information, etc. The data can be communicated to the gateway 208 using the bearers for communicating over the tunnel corresponding to the packet data context. Packet data context establishing component 230 can receive the data, and packet filtering component 232 can ensure the data relates to CSG administration server 212 or one or more other CSG provisioning entities, for example.

In one example, packet filtering component 232 can verify an address related to the packet to ensure the packet is intended for (e.g., addressed to or from) a CSG provisioning component, such as CSG administration server 212. If not, packet filtering component 232 can refrain from routing the packet to ensure communications from device 202 are limited to CSG provisioning. It is to be appreciated, in one example, that gateway 208 can allow device 202 access to other nodes (not shown) as part of non-provisioned access, such as one or more servers with information specific to the MME 206, gateway 208, a service provider or location thereof (e.g., an airport, restaurant, etc.).

Where packets relate to CSG administration server 212, packet filtering component 232 can communicate the packets from device 202 to CSG administration server 212. CSG provisioning component 238 can receive and process the packets for device 202. For example, this can include storing an association between device 202 (e.g., an address or other identifier thereof) and data received in the packets, such as an indication of accepting terms and conditions, login or account information, payment information, etc. In one example, it is to be appreciated that CSG provisioning component 238 can first determine whether to allow CSG provisioning to device 202 based on the received information. For example, if device 202 transmits one or more of invalid billing information, invalid login information, an indication that terms and conditions are not accepted, etc., in one example, CSG provisioning component 238 can communicate a web page or other data back to device 202 indicating errors in providing in-band provisioning to device 202.

Once CSG provisioning component 238 determines the data is valid and/or that in-band provisioning is to be provided to device 202, CSG subscription updating component 240 can attempt to update a CSG subscription for the device 202 to provision the device 202 at the CSG. This can include, for example, CSG subscription updating component 240 communicating with HSS/HLR 210 to update CSG subscription data for device 202. CSG update receiving component 234 can receive a request to update the CSG subscription information from CSG administration server 212. In this example, subscriber data updating component 236 can indicate to MME 206 to update CSG subscription information to allow device 202 to access the CSG (e.g., to access one or more H(e)NBs or other nodes in the CSG). For example, this can include transmitting an insert subscriber data message that includes subscription data for device 202. CSG subscription component 228 can receive the indication or message, and can accordingly update CSG subscription information to include device 202. For example, the subscription data can be of substantially any granularity, such as enabling device access to any H(e)NB in the CSG, access to only H(e)NB 204, timed access, access based on one or more other parameters, etc. CSG subscription component 228 can accordingly manage device 202 access to H(e)NB 204 and/or other H(e)NBs in the CSG based on the subscription data. This can include controlling access to H(e)NB 204 or other H(e)NBs based on the subscription data.

Following provisioning, in one example, packet data context establishing component 226 deactivates the packet data context used to perform provisioning, which can include removing the tunnel between H(e)NB 204 and gateway 208, removing the radio bearer established at H(e)NB 204 for device 202, and/or the like. This can be based at least in part on, for example, CSG subscription component 228 receiving the subscription data, receiving an indication from HSS/HLR 210 that subscription data communication is complete, etc. In another example, packet data context establishing component 230 can similarly deactivate the packet data context. Packet data context requesting component 216 can detect deactivation, and CSG accessing component 220 can accordingly attempt access to H(e)NB 204. It is to be appreciated, for example, that once registered, CSG accessing component 220 can attempt access to H(e)NB 204 for a period of time. Thus, for example, once provisioned, device 202 may have permission to request access to H(e)NB 204 for a certain time period. For example, where device 202 reselects to another access point, device 202 can still consider H(e)NB 204 for reselection for a period of time without having to repeat an in-band provisioning for access. If access is not allowed (e.g., where the time period expires), device 202 can again perform in-band provisioning.

Moreover, CSG subscription component 228 can determine whether device 202 is allowed to access H(e)NB 204 based at least in part on subscription data stored for the device 202. If so, MME 206 can allow device 202 to communicate through H(e)NB 204. If not, MME 206 can reject the access request from device 202. In another example, packet data context establishing component 226 can deactivate the packet data context based at least in part on detecting expiration of a timer. For example, packet data context establishing component 226 can initialize the timer as part of establishing the packet data context. Where the timer expires without receiving subscription data from HSS/HLR 210, packet data context establishing component 230 can deactivate the packet data context, and/or can notify device 202 of the deactivation. In another example, packet data context establishing component 230 can similarly deactivate the packet data context. For example, packet data context establishing component 230 can initiate a timer upon establishing the packet data context, and can detect expiration of the timer before data related to device 202 is received over the corresponding tunnel. In this case, packet data context establishing component 230 can deactivate the packet data context, which can include notifying packet data context establishing component 226 of the deactivation. As described above, packet data context establishing component 226 can remove bearers associated with the packet data context based at least in part on receiving the notification.

Moreover, in another example, it is to be appreciated that device 202 can first attempt connection with H(e)NB 204 to determine whether provisioning is required. For example, CSG subscription component 228 can store CSG subscription data for a period of time, and thus device 202 may not need to perform provisioning for every connection to H(e)NB 204. Rather, for example, upon a connection attempt from device 202, CSG subscription component 228 can determine whether subscription data for device 202 is valid, and if so, MME 206 can allow device 202 access to H(e)NB 204.

Furthermore, there can be other examples for selecting H(e)NB 204, such as automatically selecting H(e)NB 204, in which case device 202 can prompt a user for provisioning. Further, though not shown, H(e)NB 204 can indicate whether a related CSG allows in-band provisioning (e.g., as a bit in system information), and provisioning support determining component 214 can determine that the H(e)NB 204 allows in-band provisioning without first registering with the H(e)NB 204 or MME 206. In yet another example, packet data context requesting component 216 can determine whether there is an active packet data context for in-band provisioning before requesting establishment of such. Similarly, packet data context establishing component 226 can reject a request from device to establish a packet data context where one already exists for provisioning. In another aspect, for example, CSG subscription component 228 can maintain billing data related to device 202 utilizing the CSG, and can provide such data to HSS/HLR 210 or one or more other home PLMN nodes (e.g., through HSS/HLR 210 or otherwise) for billing a user of the device 202 by an operator of the HSS/HLR 210.

Figure 3:
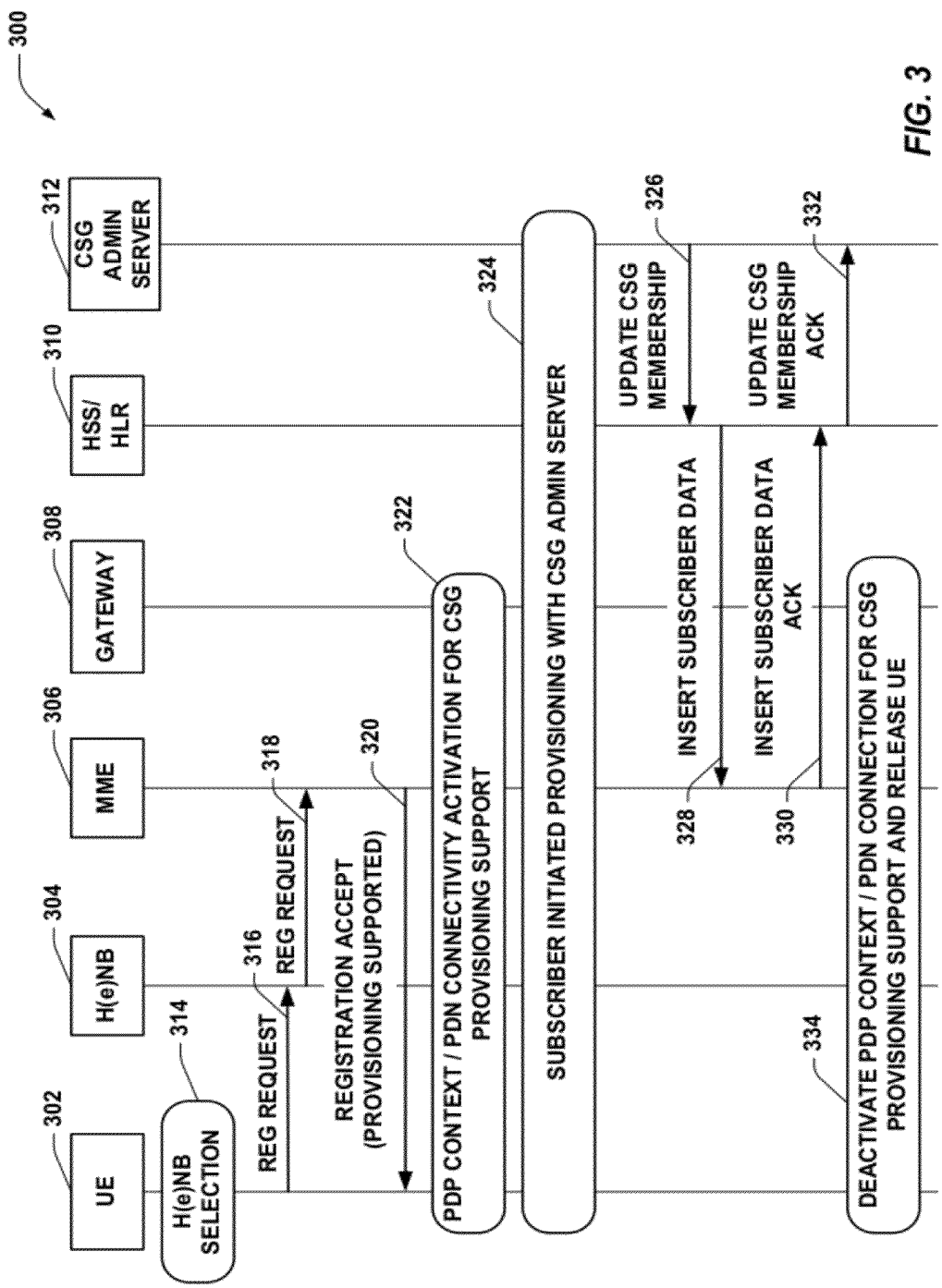
FIG. 3 illustrates an example system that performs in-band CSG provisioning of a device.

Referring to FIG. 3, illustrated is an example wireless communication system 300 that facilitates in-band provisioning at a CSG. System 300 can include a UE 302 that selects an H(e)NB 304 for receiving wireless network access. H(e)NB 304 can allow at least limited access to one or more core network components, such as an MME 306, which can additionally or alternatively be a SGSN, gateway 308, which can be a GGSN, P-GW, etc., an HSS/HLR 310 (and/or HLR), CSG administration server 312, and/or the like. As shown, UE 302 can perform an H(e)NB selection 314 to select to communicate with H(e)NB 304. This can include, for example, manual selection by a user operating UE 302, automatic selection based on detecting H(e)NB 304, and/or the like. In one example, a user can initiate a manual selection procedure at UE 302, which can cause UE 302 to detect surrounding H(e)NBs and display the H(e)NBs or related CSG, PLMN, or similar information in a list for selection at 314. In another example, CSGs can be displayed, and the selection can include selecting a CSG related to H(e)NB 304.

Selection of H(e)NB 304, a corresponding CSG, and/or the like at 314 can cause UE 302 to send a registration request 316 to H(e)NB 304. In one example, the registration request 316 can be a LAU/RAU/TAU request that indicates CSG provisioning is desired by UE 302. An indicator included in the message can be an EPS update type in the registration request, in one example. H(e)NB 304 can forward the registration request to MME 306. It is to be appreciated, in another example, that attach requests can be utilized in addition or alternatively to registration requests 316 and 318. If MME 306 does not support in-band CSG provisioning, MME 306 can reject LAU/RAU/TAU request from UE 302 that indicates CSG provisioning as the EPS type.

Where MME 306 does support in-band provisioning, MME 306 can additionally perform the LAU/RAU/TAU procedures to authenticate UE 302, retrieve a UE context, and/or the like, in one example. Moreover, for example, MME 306 can determine whether a CSG identifier specified in the registration request 318 or a CSG identifier related to an APN in the registration request 318 is at least one of included in CSG subscription information at MME 306, expired, and/or the like. Where the CSG identifier is not present in the registration request 318 and/or is determined to not be expired, MME 306 can transmit a registration accept 320 to UE 302, via H(e)NB 304, with a CSG provisioning support indicator indicating in-band provisioning is supported by the CSG of H(e)NB 304. For example, in-band provisioning support can be operator-specific, and thus indicated by MME 306.

In addition, as described, the indication of whether in-band provisioning is supported can be a CSG provisioning support indicator that can specify additional information regarding a level of service allowed without provisioning, and/or the like, as described. Based at least in part on receiving the registration accept with CSG provisioning support indicator 320, UE 302 can determine to activate a PDP context or PDN connection (or other packet data context) for CSG provisioning support at 322. As described, UE 302 can include an indication that the PDP context or PDN connection activation relates to in-band CSG provisioning. MME 306 can receive a request to establish the PDP context or PDN connection from UE 302 as part of the procedure at 322, and MME 306 can select a gateway 308 to facilitate requesting CSG provisioning from one or more network nodes. MME 306 can select the gateway 308 according to a gateway selection function based at least in part on an APN specified in the request (e.g., relating to CSG provisioning), as described, an explicitly specified gateway, and/or the like.

In one example, UE 302 can specify CSG provisioning configuration data in the request. The CSG provisioning configuration data can include some or all of the following information, in one example.

| Field | Description |
| --- | --- |
| CSG Provisioning APN | A label according to DNS naming conventions describing the access point used for CSG provisioning PDN connection. |
| CSG Provisioning Quality of Service (QoS) Profile | The bearer level QoS parameter values for CSG provisioning APNs default bearer. |
| CSG Provisioning APN-Aggregate Maximum Bit Rate (AMBR) | The maximum aggregated uplink and downlink maximum bit rate (MBR) values to be shared across all non-guaranteed bit rate (GBR) bearers, which are established for the CSG provisioning APN, as decided by the GGSN/P-GW |
| CSG Provisioning GGSN/P-GW Identity | The statically configured identity of the GGSN/P-GW used for CSG provisioning APN. The GGSN/P-GW identity can be either an FQDN or IP address. |

Thus, MME 306 can determine gateway 308 based at least in part on the CSG Provisioning GGSN/P-GW Identity, in this example. In another example, MME 306 can derive the gateway 308 using a selection function based at least in part on a stored mapping of the CSG Provisioning APN to the gateway 308 (or an identifier or address thereof). In either case, MME 306 can establish a PDP context or PDN connection with gateway 308 upon identification, and can associate the PDP context or PDN connection with one or more data bearers established for receiving communications from UE 302 through H(e)NB 304.

In this regard, UE 302 can transmit data over the one or more data bearers through H(e)NB 304, which can be received and processed by gateway 308. For example, gateway 308 can filter the data to allow forwarding of data related to CSG provisioning, while rejecting other data. For example, gateway 308 can allow data intended for or received from CSG administration server 312 (e.g., which can be indicated as a destination or source address in a packet header, and/or the like). In this regard, UE 302 can perform provisioning with CSG administration server 312 over the PDN connection at 324. In this example, gateway 308 can determine that data from the UE 302 relates to CSG administration server 312 and can accordingly forward the data thereto. In one example, UE 302 can launch a browser that automatically redirects to a web page that supports provisioning the UE 302 at CSG. UE 302 can submit additional data (e.g., from the web page) to facilitate CSG provisioning, such as an indication of accepting terms and conditions, billing or login information, etc.

CSG administration server 312 can receive the additional data and determine whether to allow UE 302 access to the CSG. In this example, CSG administration server 312 can transmit an update CSG membership message 326 to HSS/HLR 310 to cause updating of CSG subscription information for UE 302 to include the CSG. HSS/HLR 310 can, thus, transmit an insert subscriber data message 328 to MME 306 to indicate the change in CSG subscription data for UE 302 to allow connection to CSG. The subscription data, as described, can be of substantially any granularity, such as a bit indicator or whether access is allowed in the CSG, allowed for H(e)NB 304, a period of time for which access is allowed, etc. MME 306 can accordingly respond with an insert subscriber data acknowledgement message 330 and can manage CSG subscription and access, as described. HSS/HLR 310 can respond with an update CSG membership acknowledgement message 322. In addition, the PDP context or PDN connection for provisioning support can be deactivated and the UE released at 334 (e.g., by MME 306 upon sending the insert subscriber data acknowledgement message 330, in one example, or upon expiration of an inactivity or other connection-related timer). The UE 302 can then attempt a connection to H(e)NB 304 or other node in the CSG to receive an increased level of network access therefrom (e.g., open access or some other level beyond provisioning access) according to the subscription data.

Referring to FIGS. 4-8, example methodologies relating to in-band provisioning of a device at a CSG are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 4:
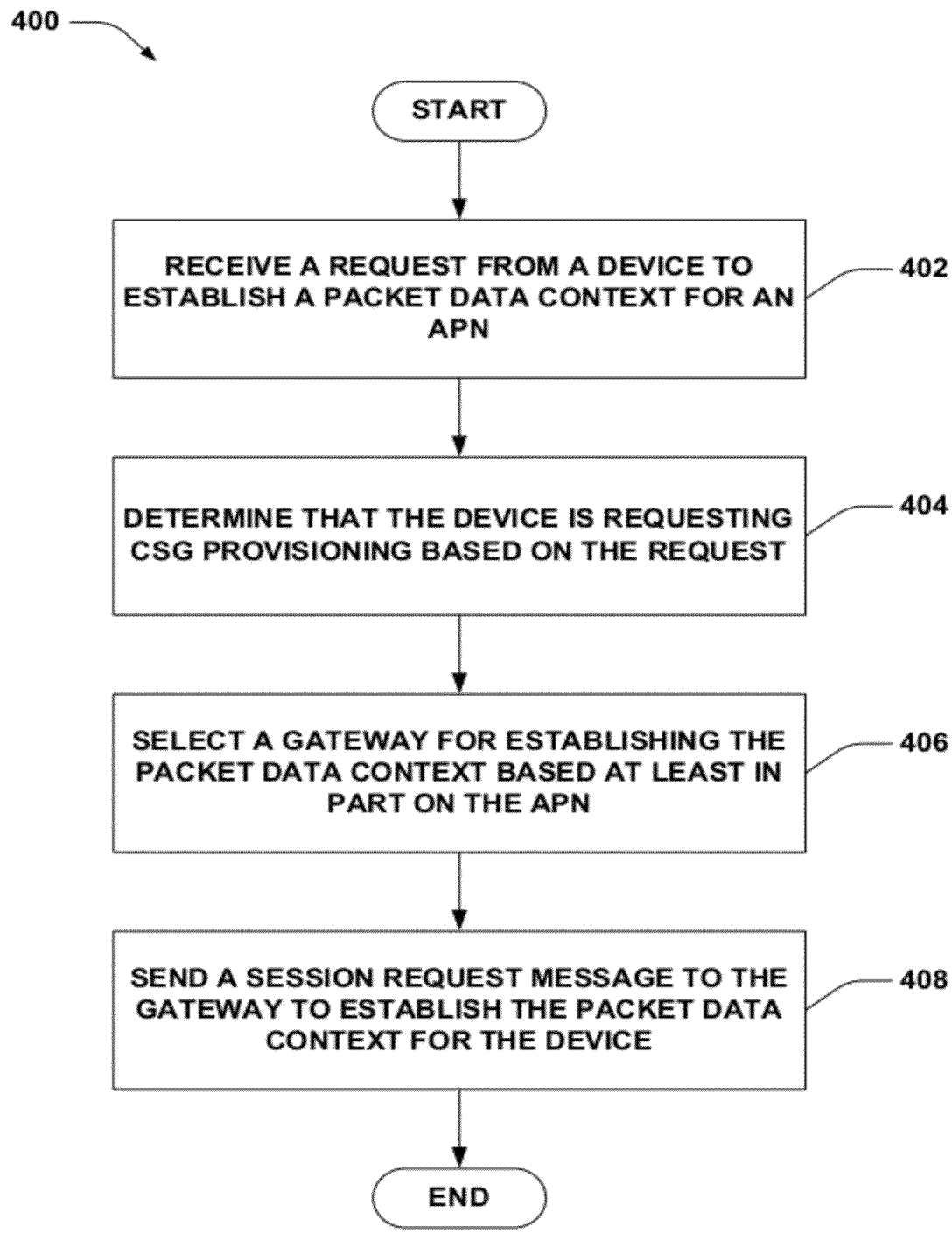
FIG. 4 illustrates an example methodology that establishes a packet data context for requesting in-band CSG provisioning.

Referring to FIG. 4, an example methodology 400 is displayed that facilitates establishing a packet data context for performing in-band provisioning. At 402, a request to establish a packet data context for an APN can be received from a device. For example, the request can relate to establishing a PDP context, PDN connection, and/or the like, as described. In addition, the APN can relate to CSG provisioning and/or the request can include a separate indicator that specifies the packet data context is for CSG provisioning. At 404, it can be determined that the device is requesting CSG provisioning based on the request. For example, this can be determined based on at least one of an indicator in the request, determining the APN corresponds to CSG provisioning, and/or the like.

At 406, a gateway can be selected for establishing the packet data context based at least in part on the APN. For example, this can include determining the gateway based at least in part on utilizing a selection function that correlates the APN to a gateway, retrieving an explicit gateway identifier from the request, and/or the like. In addition, an IP address of the gateway can be received and/or determined based on a determined identifier thereof. At 408, a session request message can be sent to the gateway to establish the packet data context for the device. This can include sending a create session request message to create a PDN connection, a create PDP context request message to establish a PDP context, and/or the like. Moreover, the session request can include an identifier that indicates the request is for CSG provisioning, such as an EPS request type, etc. Information regarding the packet data context can be provided to the device to facilitate communicating thereover to perform CSG provisioning, as described herein. In addition, access to other gateways can be deactivated to ensure the device can perform provisioning without allowing other communications.

Figure 5:
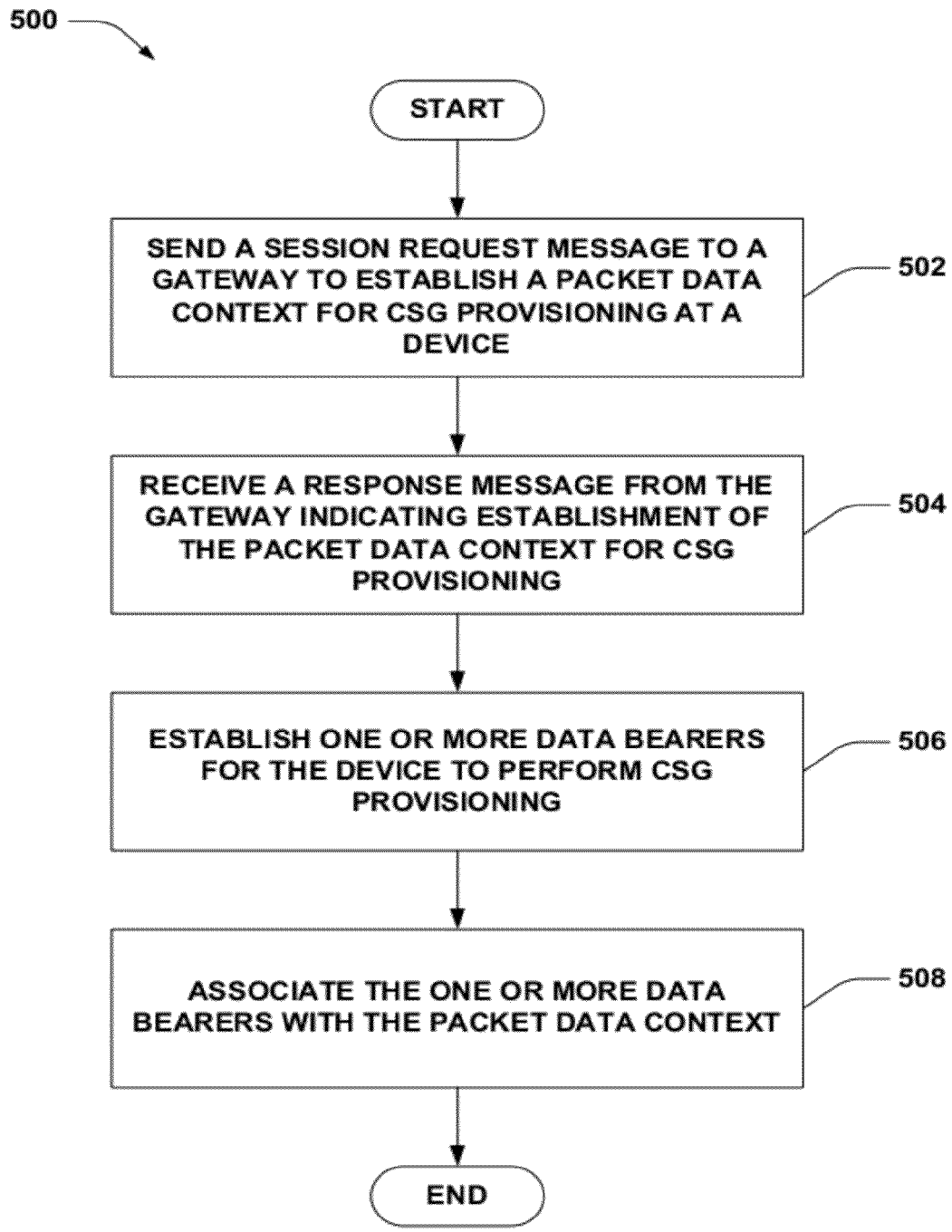
FIG. 5 illustrates an example methodology that associates a packet data context with one or more data bearers.

Turning to FIG. 5, an example methodology 500 is displayed that facilitates establishing a packet data context for a device requesting CSG provisioning. At 502, a session request message can be sent to a gateway to establish a packet data context for CSG provisioning at a device. As described, this can be a create session request message, create PDP context request message, etc. to establish a PDN connection, PDP context, etc. for the device. As described, an indicator can be specified in the session request message to indicate CSG provisioning. In addition, the session request message can be sent based at least in part on a request from the device for CSG provisioning. At 504, a response message can be received from the gateway indicating establishment of the packet data context for CSG provisioning. Similarly, the response message can be a create session response message, create PDP context response message, etc. At 506, one or more data bearers can be established to perform CSG provisioning. The data bearers can be established for the device based on a request for the packet data context, as described. At 508, the one or more data bearers can be associated with the packet data context. In this regard, the device can communicate data related to CSG provisioning over the one or more data bearers, and the data can be sent to the gateway over the packet data context, as described.

Figure 6:
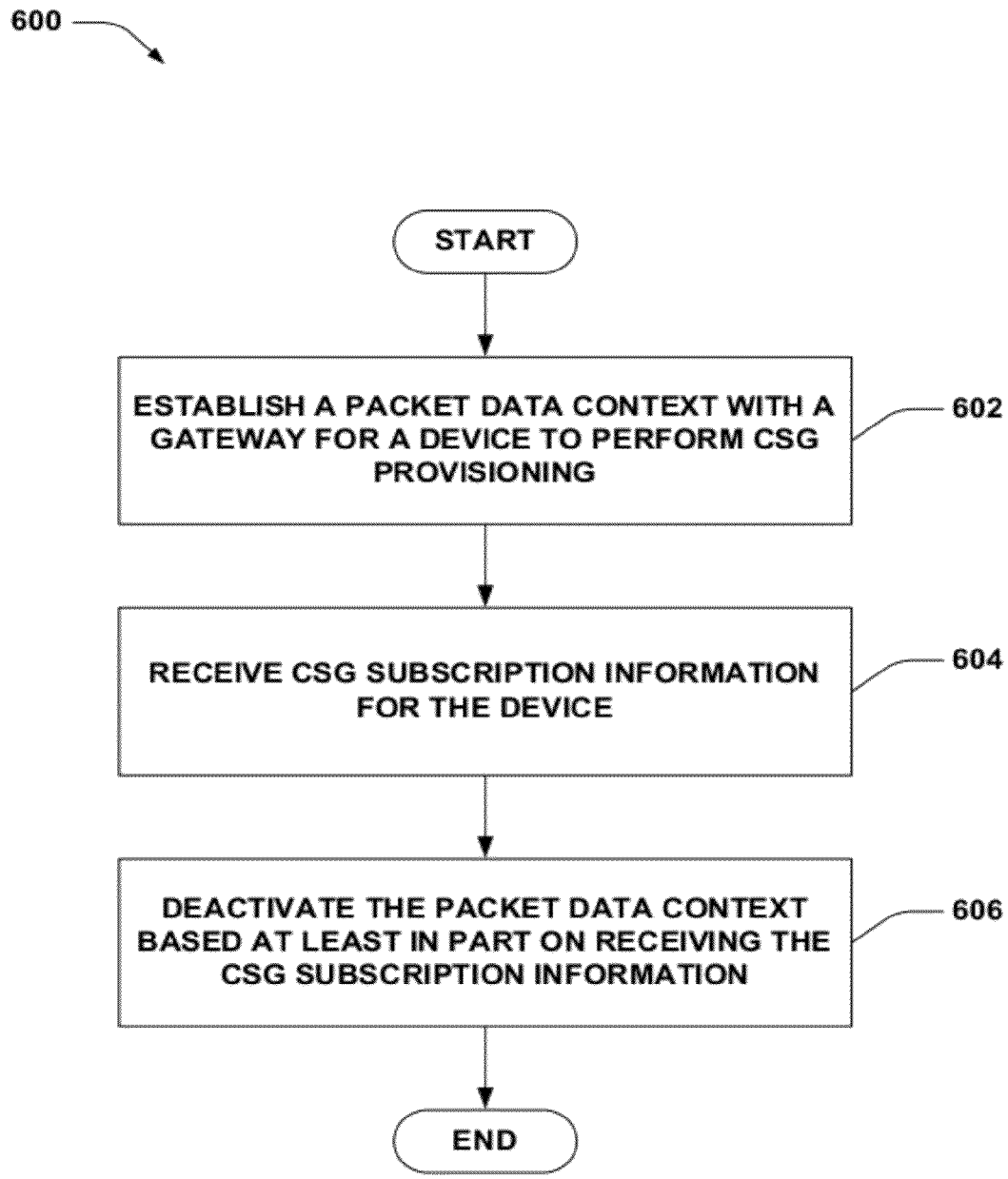
FIG. 6 illustrates an example methodology for managing a packet data context.

Referring to FIG. 6, illustrated is an example methodology 600 for managing a packet data context for CSG provisioning. At 602, a packet data context can be established with a gateway for a device to perform CSG provisioning. As described, this can include transmitting a session request message to a gateway, receiving a response message indicating establishment of the packet data context, etc. At 604, CSG subscription information can be received for the device. For example, this can be based at least in part on the device performing CSG provisioning using the packet data context, as described. At 606, the packet data context can be deactivated based at least in part on receiving the CSG subscription information. As described, receiving the CSG subscription information can indicate the packet data context is no longer needed for provisioning. As described, in another example, deactivating the packet data context can additionally or alternatively be based on a timer.

Figure 7:
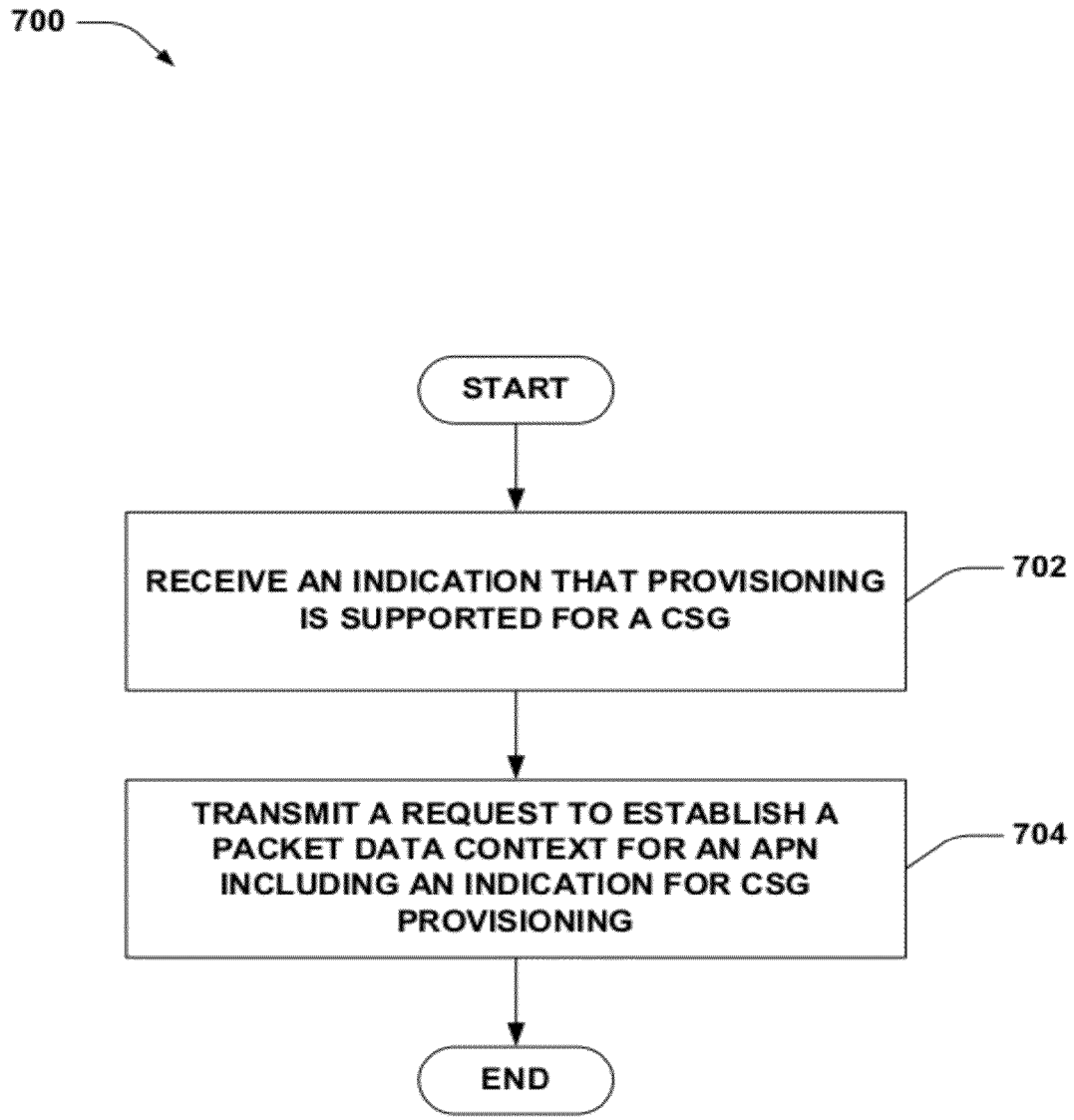
FIG. 7 illustrates an example methodology that transmits a request to establish a packet data context for performing CSG provisioning.

Turning to FIG. 7, an example methodology 700 is displayed that facilitates requesting a packet data context for CSG provisioning. At 702, an indication that provisioning is supported can be received for a CSG. In one example, this can be in response to a registration or attach request sent to an MME, H(e)NB, or other node. At 704, a request to establish a packet data context for an APN including an indication for CSG provisioning can be transmitted. As described, the indication can be the APN that specifies CSG provisioning, an EPS request type or other parameter that specifies CSG provisioning, and/or the like. In this regard, an MME, SGSN, or similar node, can establish a packet data context, which can be used to transmit data related to CSG provisioning.

Figure 8:
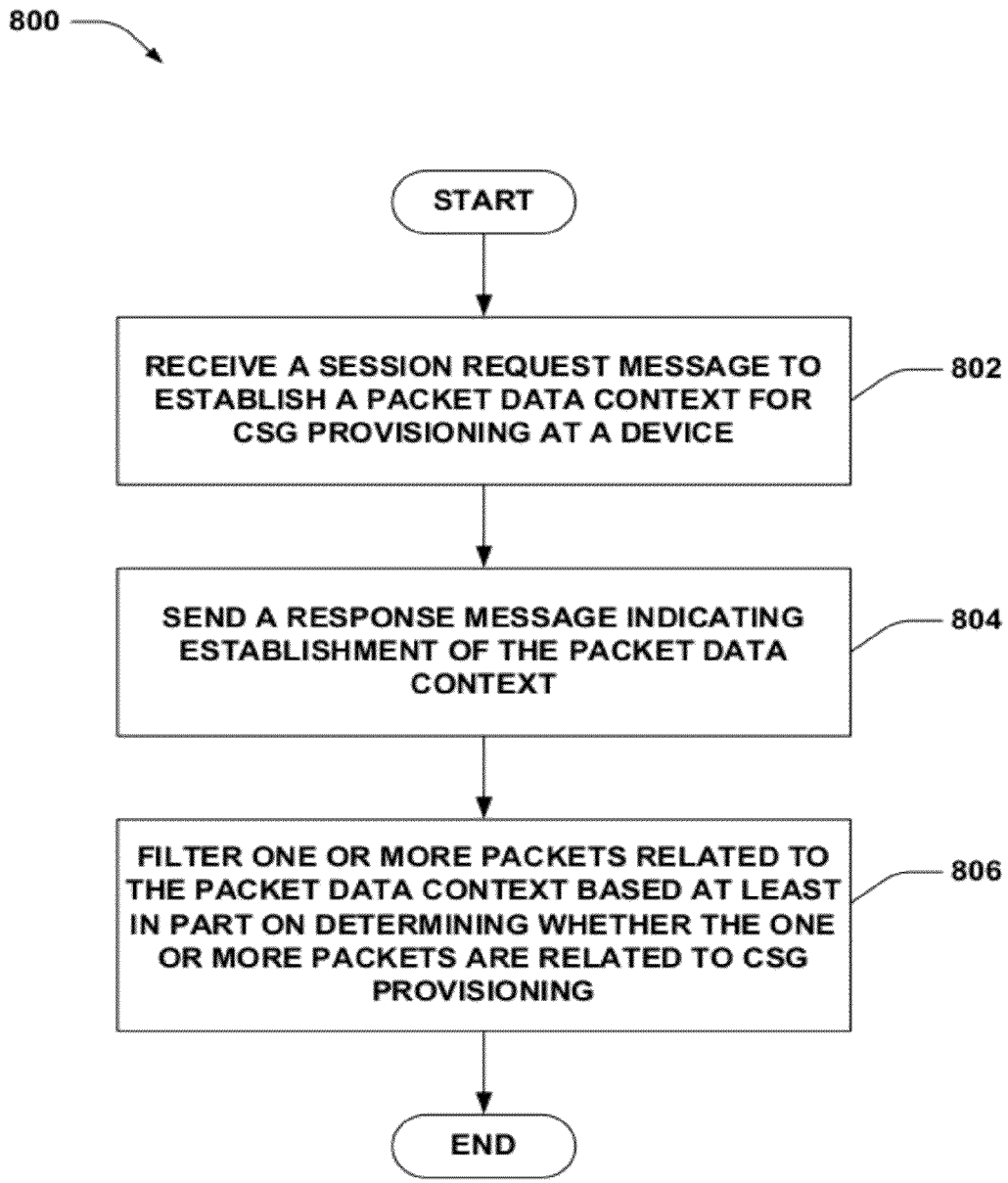
FIG. 8 illustrates an example methodology for filtering packets sent over a packet data context.

Referring to FIG. 8, illustrated is an example methodology 800 for filtering packets to allow CSG provisioning. At 802, a session request message to establish a packet data context for CSG provisioning at a device can be received. The session request message, as described for example, can be a create session request message, a create PDP context request message, and/or the like. In addition, the request message can include an indicator specifying the request message is related to CSG provisioning. At 804, a response message indicating establishment of the packet data context can be sent. Similarly, this can be a create session response message, a create PDP context response message, and/or the like. At 806, one or more packets related to the packet data context can be filtered based at least in part on determining whether the one or more packets are related to provisioning. As described, in one example, this can include determining whether the one or more packets are intended for a CSG administration server (e.g., whether a destination or source address is for the CSG administration server). Other packets, for example, can be blocked. Moreover, for example, the packet data context can be deactivated based at least in part on a timer, completion of CSG provisioning, and/or the like.

It will be appreciated that, in accordance with one or more aspects described herein, inferences can be made regarding determining whether in-band provisioning is allowed at a CSG, determining whether one or more packets are intended for CSG provisioning, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
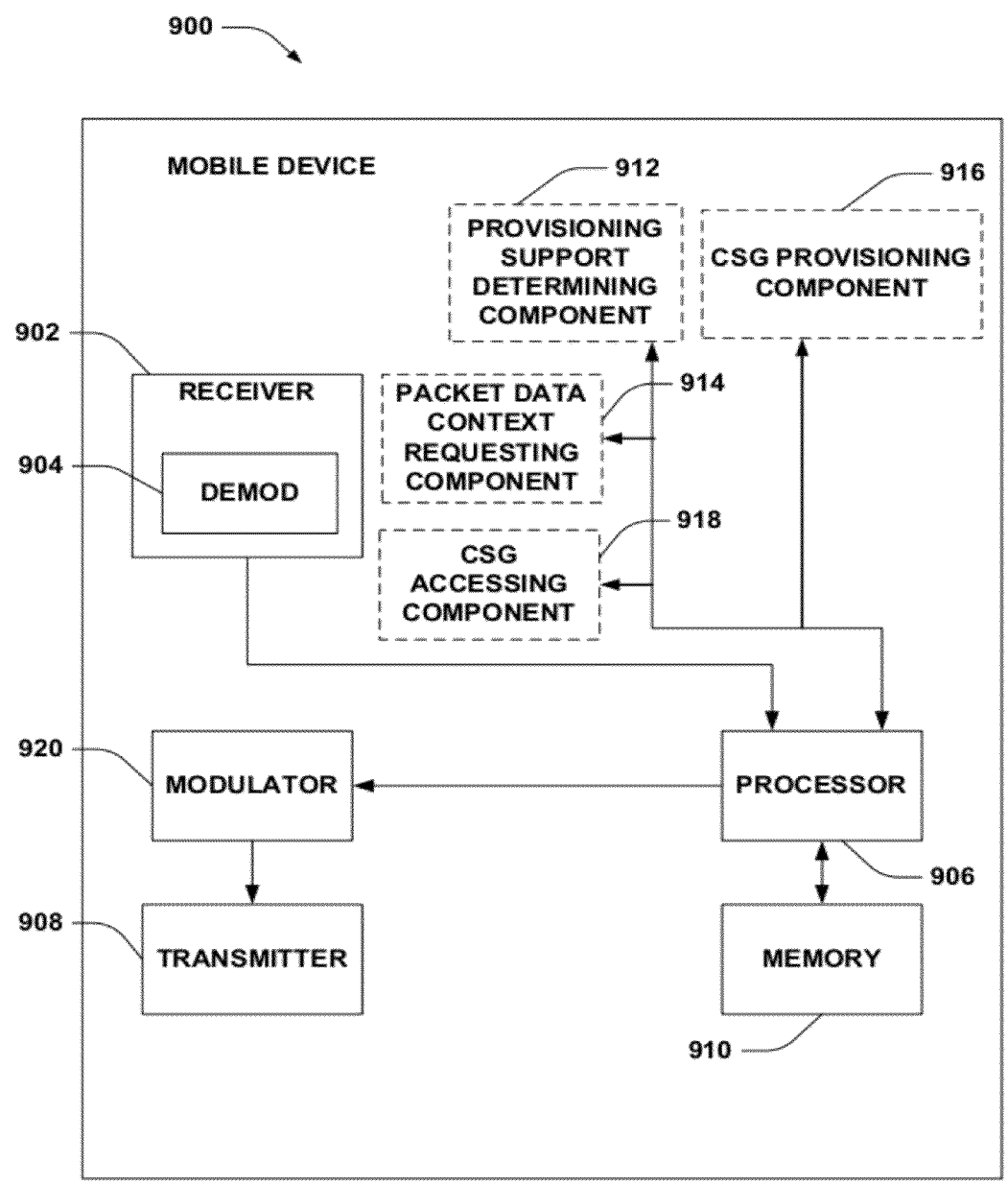
FIG. 9 illustrates an example mobile device that can request in-band CSG provisioning.

FIG. 9 is an illustration of a mobile device 900 that facilitates requesting in-band CSG provisioning. Mobile device 900 comprises a receiver 902 that receives a signal from, for instance, a receive antenna (not shown), performs typical actions on (e.g., filters, amplifies, downconverts, etc.) the received signal, and digitizes the conditioned signal to obtain samples. Receiver 902 can comprise a demodulator 904 that can demodulate received symbols and provide them to a processor 906 for channel estimation. Processor 906 can be a processor dedicated to analyzing information received by receiver 902 and/or generating information for transmission by a transmitter 908, a processor that controls one or more components of mobile device 900, and/or a processor that both analyzes information received by receiver 902, generates information for transmission by transmitter 908, and controls one or more components of mobile device 900.

Mobile device 900 can additionally comprise memory 910 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 910 can additionally store protocols and/or algorithms associated with estimating and/or utilizing a channel (e.g., performance based, capacity based, etc.).

It will be appreciated that the data store (e.g., memory 910) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and methods is intended to comprise, without being limited to, these and any other suitable types of memory.

Processor 906 can further be optionally operatively coupled to a provisioning support determining component 912, which can be similar to provisioning support determining component 214, and packet data context requesting component 914 can be similar to packet data context requesting component 216. Processor 906 can also be optionally operatively coupled to a CSG provisioning component 916, which can be similar to CSG provisioning component 218, and a CSG accessing component 918, which can be similar to CSG accessing component 220. Mobile device 900 still further comprises a modulator 920 that modulate signals for transmission by transmitter 908 to, for instance, a base station, another mobile device, etc. Although depicted as being separate from the processor 906, it is to be appreciated that the provisioning support determining component 912, packet data context requesting component 914, CSG provisioning component 916, CSG accessing component 918, demodulator 904, and/or modulator 920 can be part of the processor 906 or multiple processors (not shown). In another example, provisioning support determining component 912, packet data context requesting component 914, CSG provisioning component 916, CSG accessing component 918 can be components stored in memory 910 and/or executed (by processor 906) according to instructions stored in memory 910.

Figure 10:
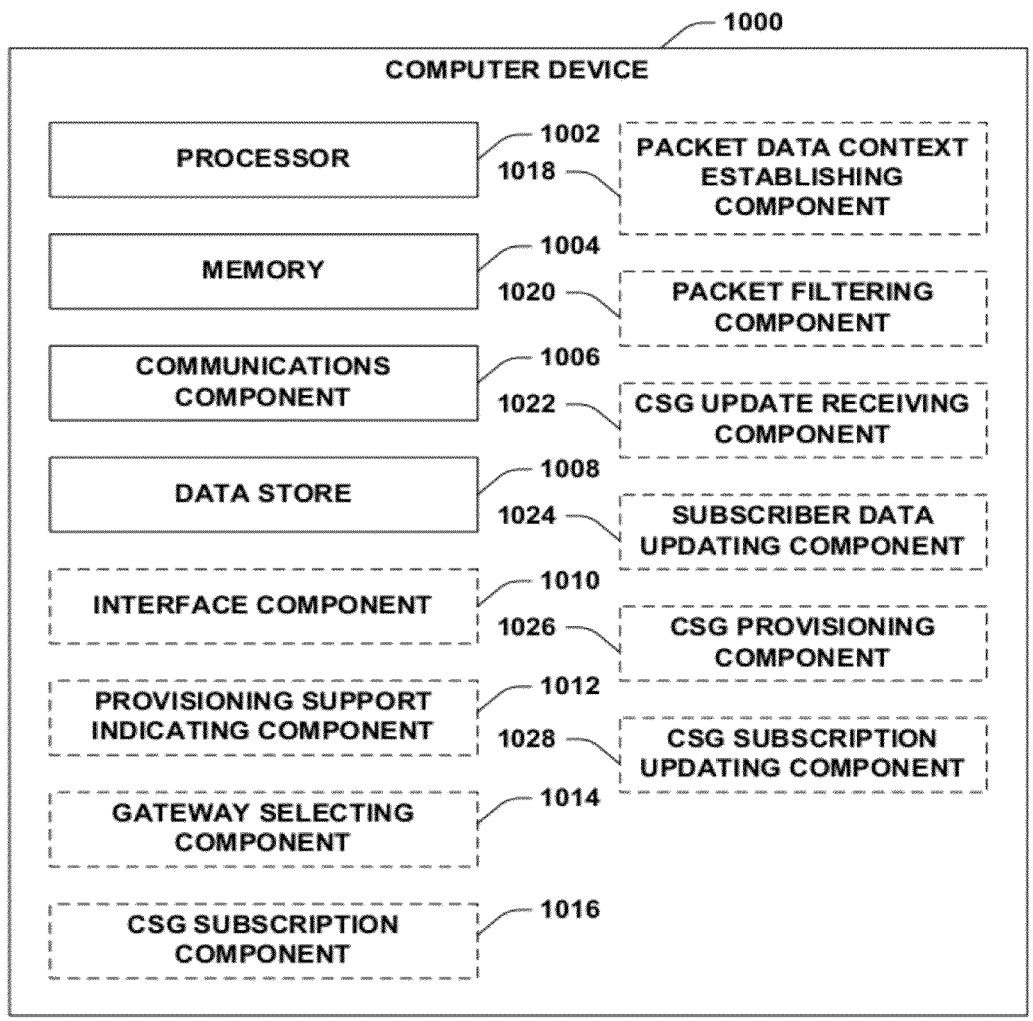
FIG. 10 illustrates an example computing device according to various aspects described herein.

Referring to FIG. 10, in one aspect, any of network node 106, MMEs 206 and 306, gateways 208 and 308, HSS/HLRs 210 and 310, CSG administration servers 212 and 312, etc. (e.g., FIGS. 1-3) can be represented by computer device 1000. Computer device 1000 includes a processor 1002 for carrying out processing functions associated with one or more of components and functions described herein. Processor 1002 can include a single or multiple set of processors or multi-core processors. Moreover, processor 1002 can be implemented as an integrated processing system and/or a distributed processing system.

Computer device 1000 further includes a memory 1004, such as for storing local versions of applications being executed by processor 1002. Memory 1004 can include substantially any type of memory usable by a computer, such as random access memory (RAM), read only memory (ROM), tapes, magnetic discs, optical discs, volatile memory, non-volatile memory, and any combination thereof. Computer device 1000 also includes one or more components 1006-1028, which can be stored in memory 1004, executed by processor 1002 (e.g., based on instructions stored in memory 1004), be implemented within one or more processors 1002, and/or the like.

Further, computer device 1000 includes a communications component 1006 that provides for establishing and maintaining communications with one or more parties utilizing hardware, software, and services as described herein. Communications component 1006 may carry communications between components on computer device 1000, as well as between computer device 1000 and external devices, such as devices located across a communications network and/or devices serially or locally connected to computer device 1000. For example, communications component 1006 may include one or more buses, and may further include transmit chain components and receive chain components associated with a transmitter and receiver, respectively, operable for interfacing with external devices.

Additionally, computer device 1000 may further include a data store 1008, which can be any suitable combination of hardware and/or software, that provides for mass storage of information, databases, and programs employed in connection with aspects described herein. For example, data store 1008 may be a data repository for applications not currently being executed by processor 1002.

Computer device 1000 may optionally include a interface component 1010 operable to receive inputs from a user of computer device 1000, and further operable to generate outputs for presentation to the user. Interface component 1010 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 1010 may include one or more output devices, including but not limited to a display, a speaker, a haptic feedback mechanism, a printer, any other mechanism capable of presenting an output to a user, or any combination thereof. In another example, interface component 1010 can be an application programming interface (API) that can be accessed by one or more devices to perform functions on computer device 1000.

In addition, in the depicted example, computer device 1000 can optionally include one or more of a provisioning support indicating component 1012, which can be similar to provisioning support indicating component 222, gateway selecting component 1014, which can be similar to gateway selecting component 224, CSG subscription component 1016, which can be similar to CSG subscription component 228, and/or packet data context establishing component 1018, which can be similar to packet data context establishing component 226 and/or 230. In addition, computer device 1000 can optionally include one or more packet filtering component 1020, which can be similar to packet filtering component 232, CSG update receiving component 1022, which can be similar to CSG update receiving component 234, subscriber data updating component 1024, which can be similar to subscriber data updating component 236, CSG provisioning component 1026, which can be similar to CSG provisioning component 238, and/or CSG subscription updating component 1028, which can be similar to CSG subscription updating component 240. Thus, these components 1012, 1014, 1016, 1018, 1020, 1022, 1024, 1026, and/or 1028 can utilize processor 1002 to execute instructions associated therewith, memory 1004 to store information associated therewith, communications component 1006 to carry out communications, and/or the like, as described. In addition, it is to be appreciated that computer device 1000 can include additional or alternative components described herein.

Figure 11:
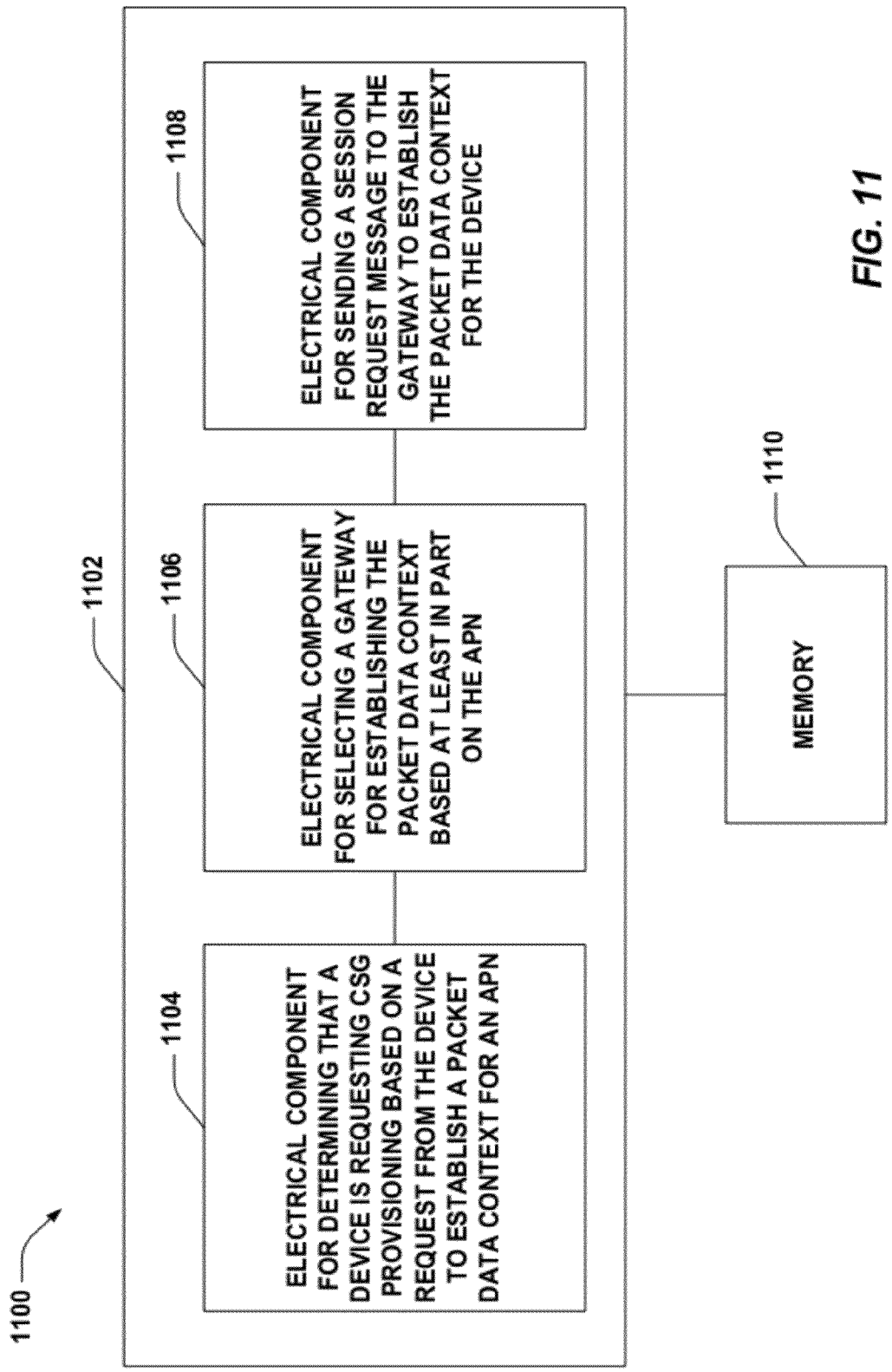
FIG. 11 illustrates an example system for establishing a packet data context for requesting in-band CSG provisioning.

With reference to FIG. 11, illustrated is a system 1100 that establishes a packet data context for requesting CSG provisioning. For example, system 1100 can reside at least partially within an MME, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for determining that a device is requesting CSG provisioning based on a request from the device to establish a packet data context for an APN 1104. As described, electrical component 1104 can determine such based at least in part on an indicator in the request, based at least in part on determining the APN corresponds to CSG provisioning, and/or the like. Moreover, the packet data context can relate to a PDP context, PDN connection, and/or the like, as described. Further, logical grouping 1102 can comprise an electrical component for selecting a gateway for establishing the packet data context based at least in part on the APN 1106.

As described, for example, electrical component 1106 can select the gateway according to a selection function based on the APN, determine the gateway from an explicit indicator in the request, and/or the like. In addition, selecting the gateway can include determining an IP address of the gateway (e.g., based on a DNS search of a received gateway identifier, etc.).

Moreover, logical grouping 1102 can include an electrical component for sending a session request message to the gateway to establish the packet data context for the device 1108. As described, the session request message can be a create session request message, a create PDP context message, and/or the like. For example, electrical component 1104 can include a provisioning support determining component 214, as described above. In addition, for example, electrical component 1106, in an aspect, can include a packet data context requesting component 216, as described above. Furthermore, electrical component 1108, in an aspect, can include a CSG provisioning component 218, as described. Additionally, system 1100 can include a memory 1110 that retains instructions for executing functions associated with the electrical components 1104, 1106, and 1108. While shown as being external to memory 1110, it is to be understood that one or more of the electrical components 1104, 1106, and 1108 can exist within memory 1110.

In one example, electrical components 1104, 1106, and 1108 can comprise at least one processor, or each electrical component 1104, 1106, and 1108 can be a corresponding module of at least one processor. Moreover, in an additional or alternative example, electrical components 1104, 1106, and 1108 can be a computer program product comprising a computer readable medium, where each electrical component 1104, 1106, and 1108 can be corresponding code.

Figure 12:
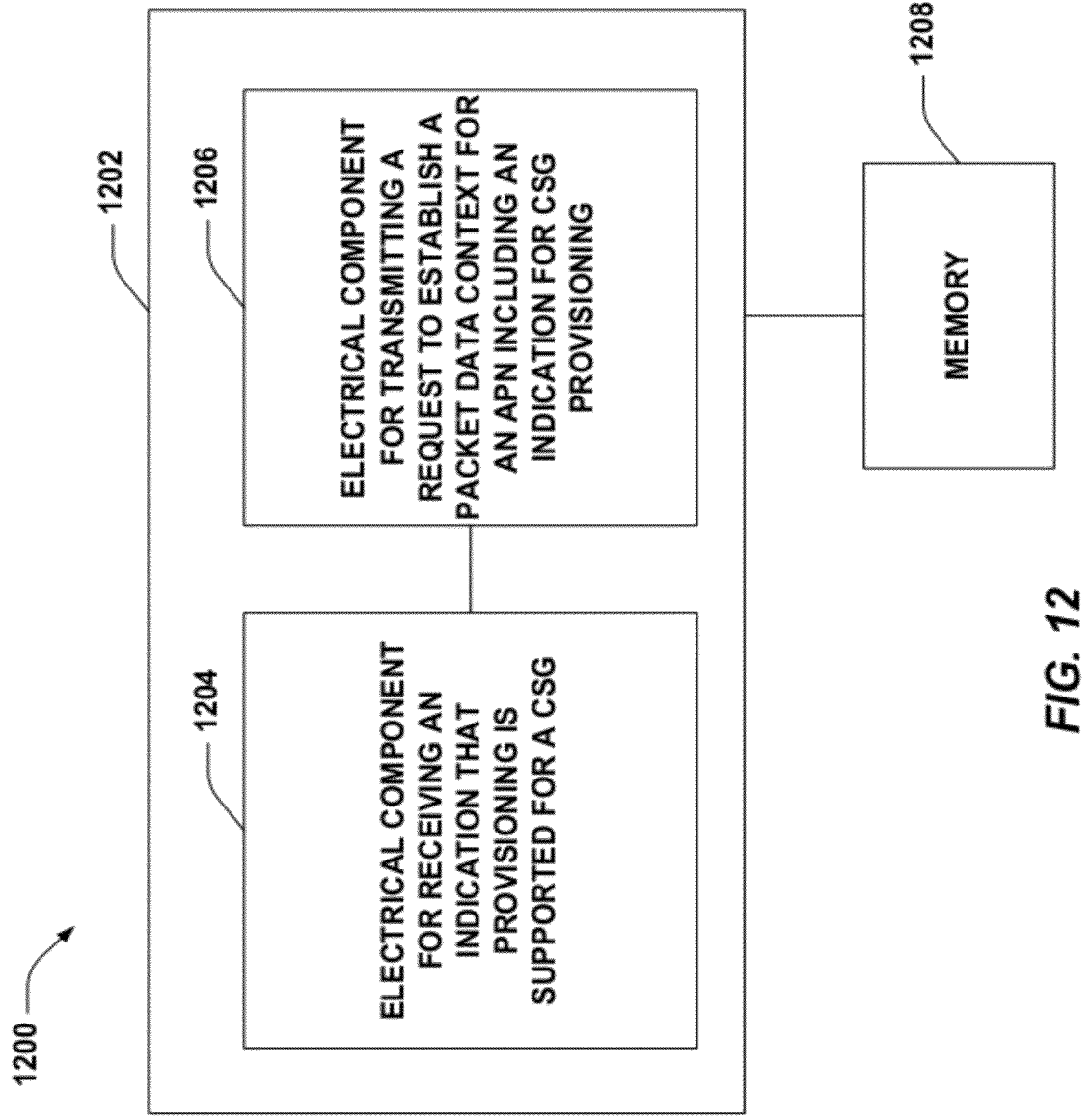
FIG. 12 illustrates an example system that transmits a request to establish a packet data context for performing CSG provisioning.

With reference to FIG. 12, illustrated is a system 1200 that establishes a packet data context for requesting CSG provisioning. For example, system 1200 can reside at least partially within a mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving an indication that provisioning is supported for a CSG 1204. As described, this can include receiving a response to a registration or attach request indicating such, in one example.

Further, logical grouping 1202 can comprise an electrical component for transmitting a request to establish a packet data context for an APN including an indication for CSG provisioning 1206. As described, for example, the request can be the APN, which can specify CSG provisioning, an EPS request type or other parameter that specifies CSG provisioning, etc. Once the packet data context is established, as described, CSG provisioning can be requested using the context to communicate with a CSG administration server or other network node. For example, electrical component 1204 can include a provisioning support determining component 214, as described above. In addition, for example, electrical component 1206, in an aspect, can include a packet data context requesting component 216, as described above. Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208.

In one example, electrical components 1204 and 1206 can comprise at least one processor, or each electrical component 1204 and 1206 can be a corresponding module of at least one processor. Moreover, in an additional or alternative example, electrical components 1204 and 1206 can be a computer program product comprising a computer readable medium, where each electrical component 1204 and 1206 can be corresponding code.

Figure 13:
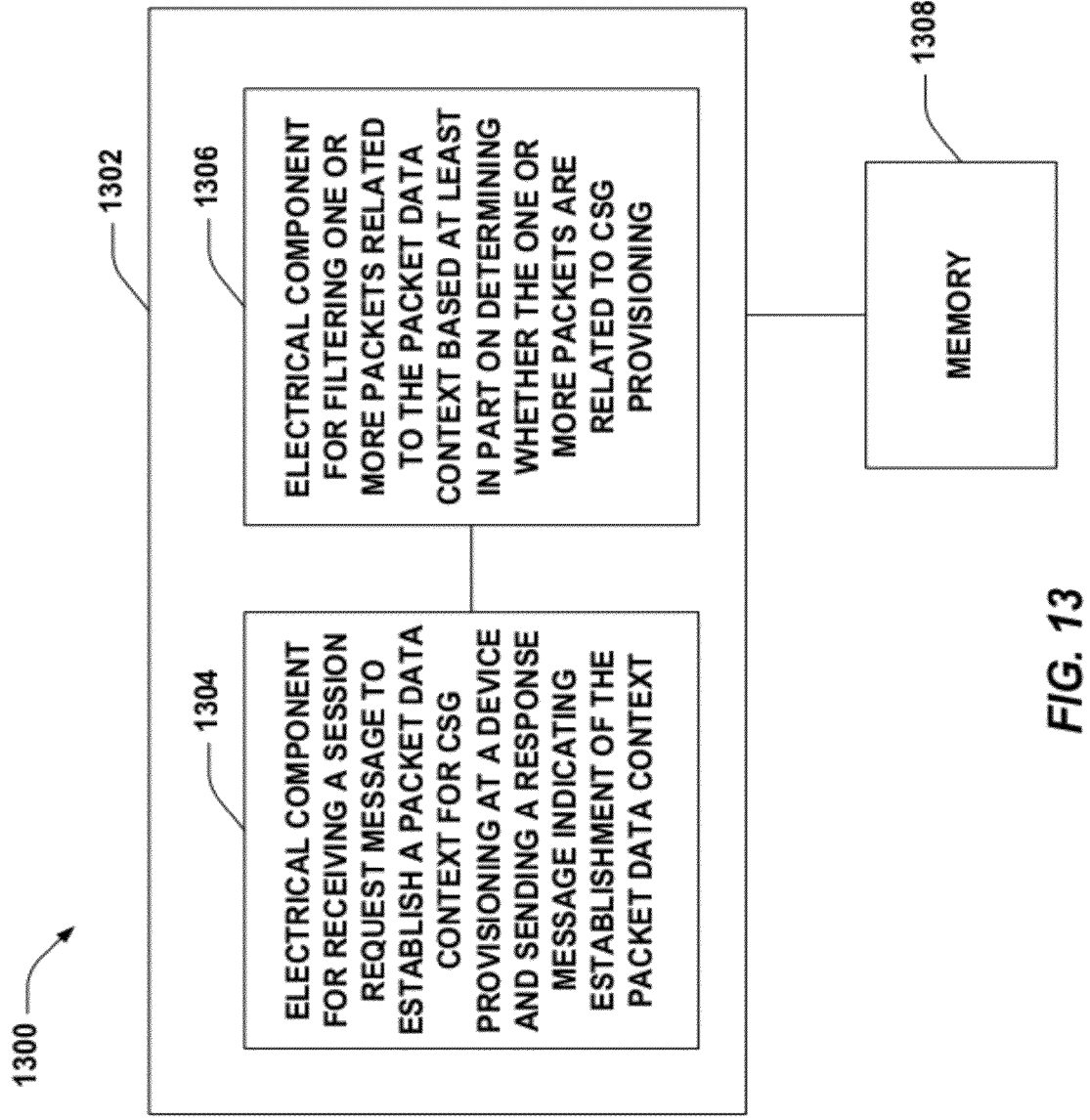
FIG. 13 illustrates an example system that filters packets sent over a packet data context.

With reference to FIG. 13, illustrated is a system 1300 that filters packets based on whether the packets relate to CSG provisioning. For example, system 1300 can reside at least partially within a gateway, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving a session request message to establish a packet data context for CSG provisioning at a device and sending a response message indicating establishment of the packet data context 1304. As described, the packet data context can relate to a PDP context, a PDN connection, etc., and thus the session request message can be a create session request message, create PDP context request message, etc., and the response message can be a create session response message, create PDP context response message, etc.

Further, logical grouping 1302 can comprise an electrical component for filtering one or more packets related to the packet data context based at least in part on determining whether the one or more packets are related to CSG provisioning 1306. As described, for example, electrical component 1306 can determine whether the one or more packets are intended for or received from a CSG administration server (e.g., based on an address in the packets), whether the one or more packets are of a certain type, etc. For example, in an aspect, electrical component 1304 can include a packet data context establishing component 230, as described above. In addition, for example, electrical component 1306, in an aspect, can include packet filtering component 232, as described above. Additionally, system 1300 can include a memory 1308 that retains instructions for executing functions associated with the electrical components 1304 and 1306. While shown as being external to memory 1308, it is to be understood that one or more of the electrical components 1304 and 1306 can exist within memory 1308.

In one example, electrical components 1304 and 1306 can comprise at least one processor, or each electrical component 1304 and 1306 can be a corresponding module of at least one processor. Moreover, in an additional or alternative example, electrical components 1304 and 1306 can be a computer program product comprising a computer readable medium, where each electrical component 1304 and 1306 can be corresponding code.

Figure 14:
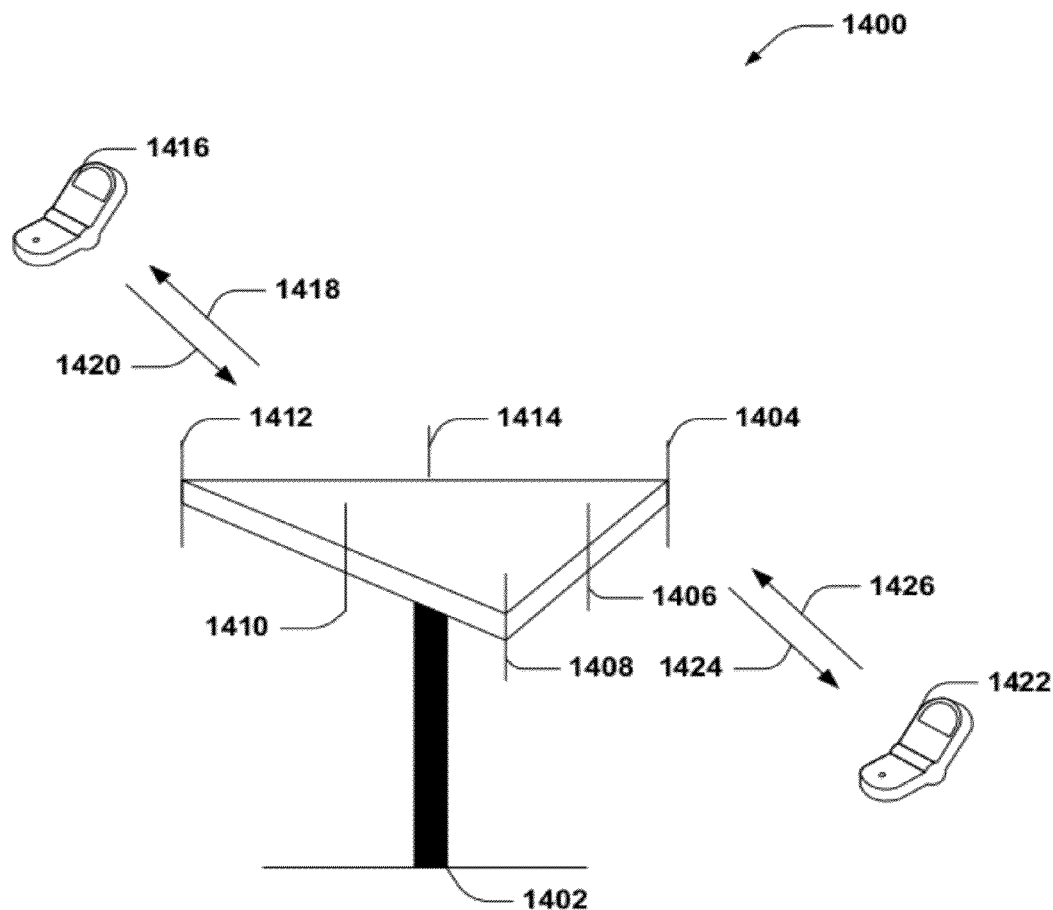
FIG. 14 illustrates an example wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology as depicted. According to an example, system 1400 can be a multiple-input multiple-output (MIMO) communication system.

Figure 15:
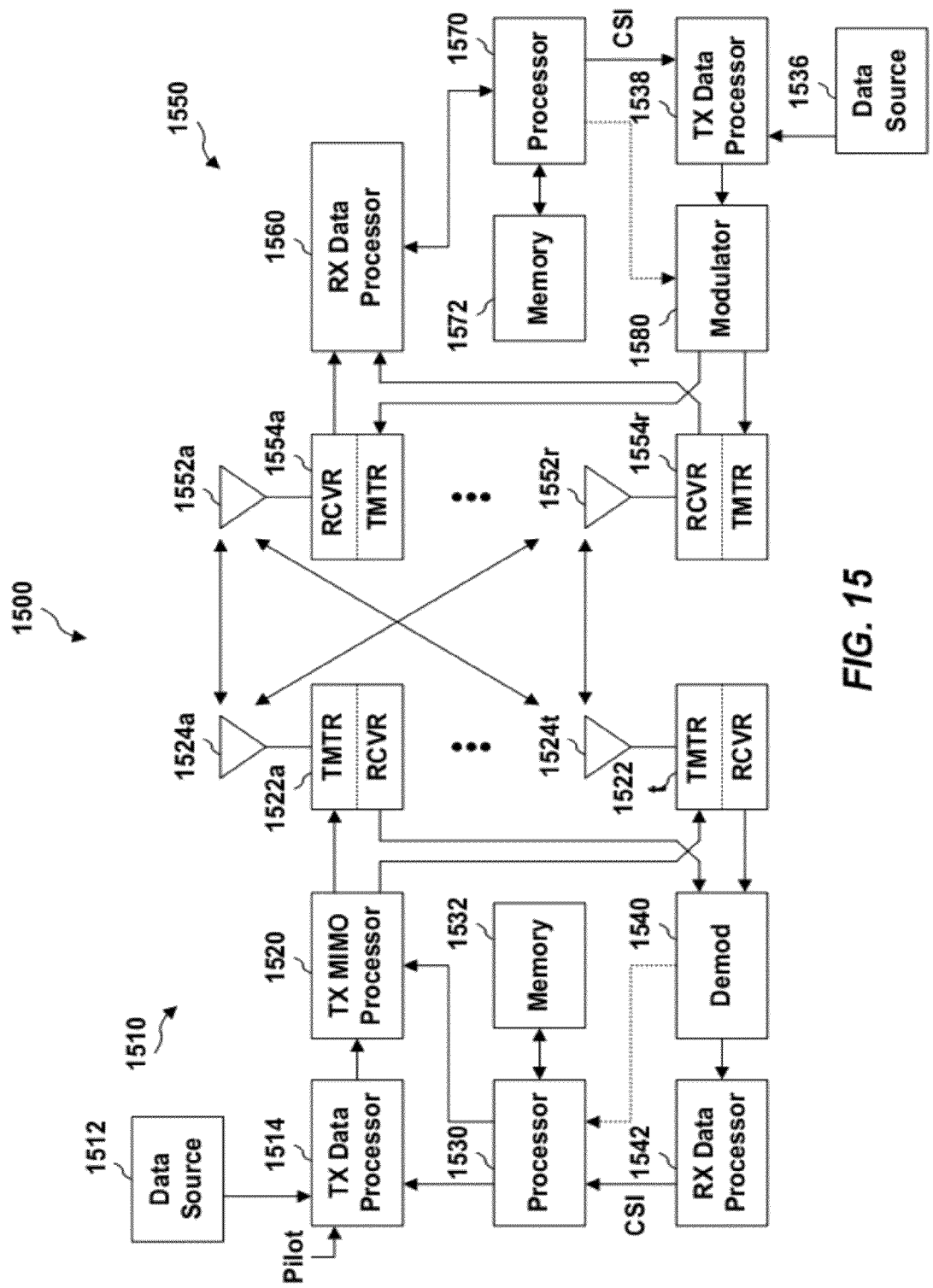
FIG. 15 illustrates an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-3 and 11-14), mobile devices (FIG. 9), computer devices, (FIG. 10), and/or methods (FIGS. 4-8) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides NT modulation symbol streams to NT transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1522a through 1522t are transmitted from NT antennas 1524a through 1524t, respectively.

At mobile device 1550, the transmitted modulated signals are received by NR antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the NR received symbol streams from NR receivers 1554 based on a particular receiver processing technique to provide NT "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

Figure 16:
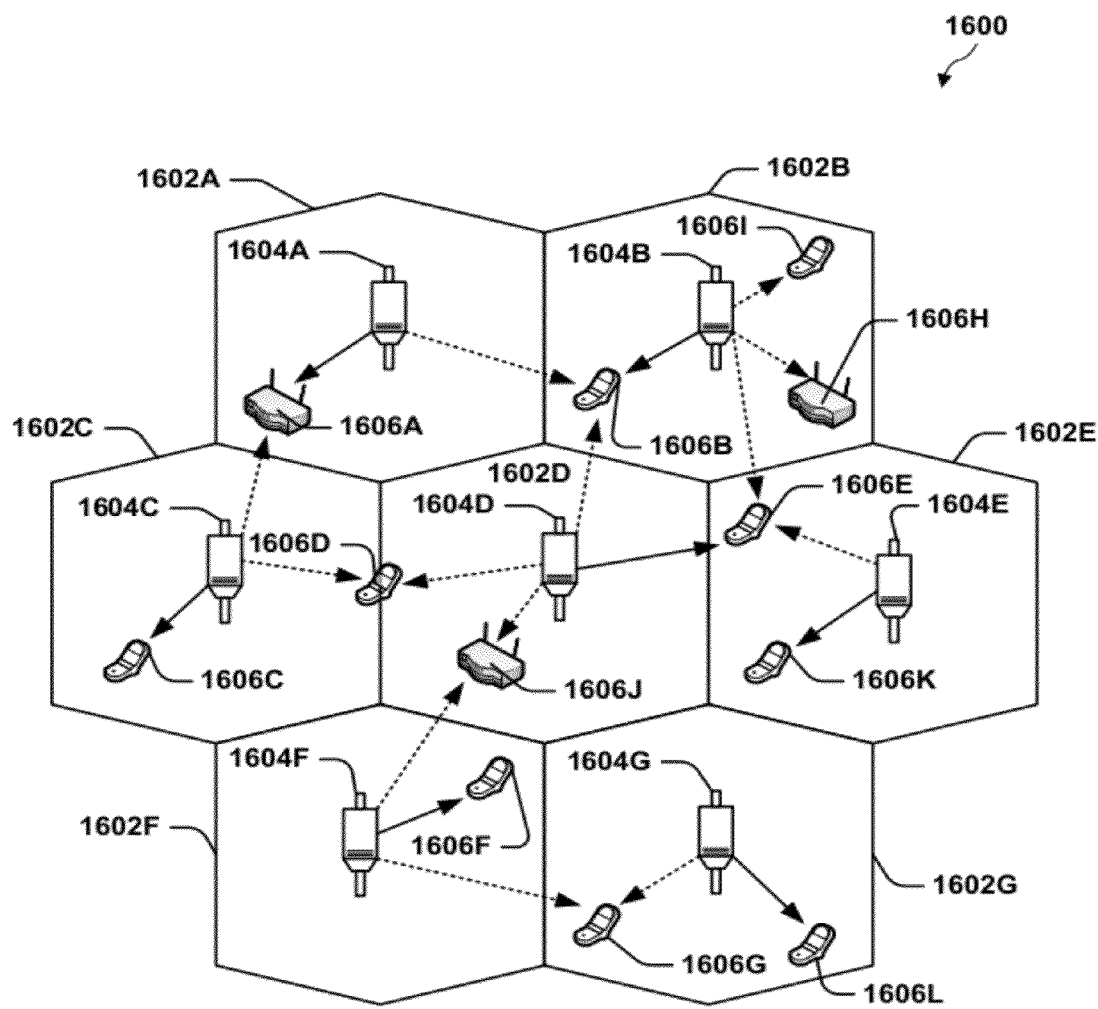
FIG. 16 illustrates a wireless communication system, configured to support a number of devices, in which the aspects herein can be implemented.

FIG. 16 illustrates a wireless communication system 1600, configured to support a number of users, in which the teachings herein may be implemented. The system 1600 provides communication for multiple cells 1602, such as, for example, macro cells 1602A-1602G, with each cell being serviced by a corresponding access node 1604 (e.g., access nodes 1604A-1604G). As shown in FIG. 16, access terminals 1606 (e.g., access terminals 1606A-1606L) can be dispersed at various locations throughout the system over time. Each access terminal 1606 can communicate with one or more access nodes 1604 on a forward link (FL) and/or a reverse link (RL) at a given moment, depending upon whether the access terminal 1606 is active and whether it is in soft handoff, for example. The wireless communication system 1600 can provide service over a large geographic region.

Figure 17:
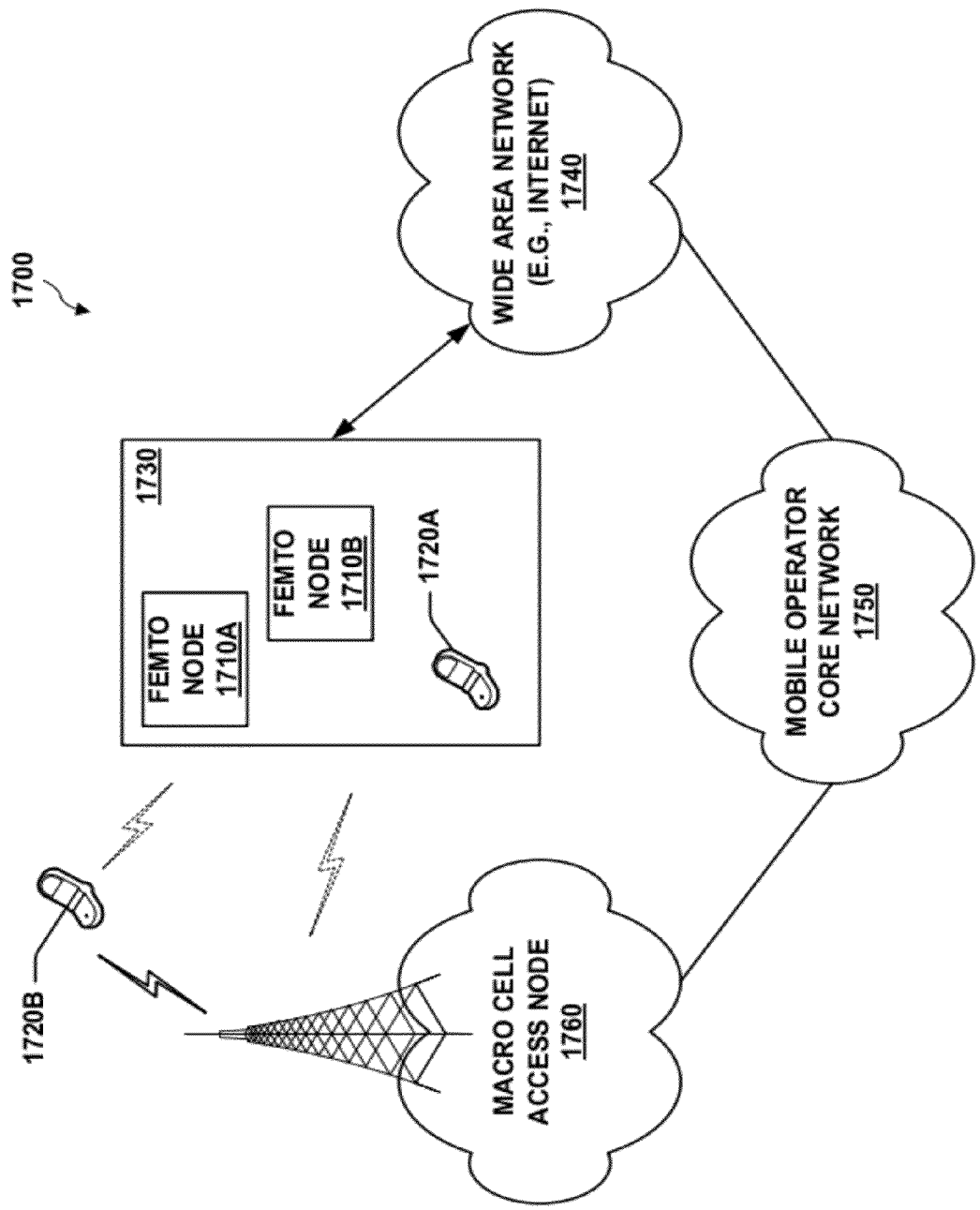
FIG. 17 illustrates an exemplary communication system to enable deployment of femtocells within a network environment.

FIG. 17 illustrates an exemplary communication system 1700 where one or more femto nodes are deployed within a network environment. Specifically, the system 1700 includes multiple femto nodes 1710A and 1710B (e.g., femtocell nodes or H(e)NB) installed in a relatively small scale network environment (e.g., in one or more user residences 1730). Each femto node 1710 can be coupled to a wide area network 1740 (e.g., the Internet) and a mobile operator core network 1750 via a digital subscriber line (DSL) router, a cable modem, a wireless link, or other connectivity means (not shown). As will be discussed below, each femto node 1710 can be configured to serve associated access terminals 1720 (e.g., access terminal 1720A) and, optionally, alien access terminals 1720 (e.g., access terminal 1720B). In other words, access to femto nodes 1710 can be restricted such that a given access terminal 1720 can be served by a set of designated (e.g., home) femto node(s) 1710 but may not be served by any non-designated femto nodes 1710 (e.g., a neighbor's femto node).

Figure 18:
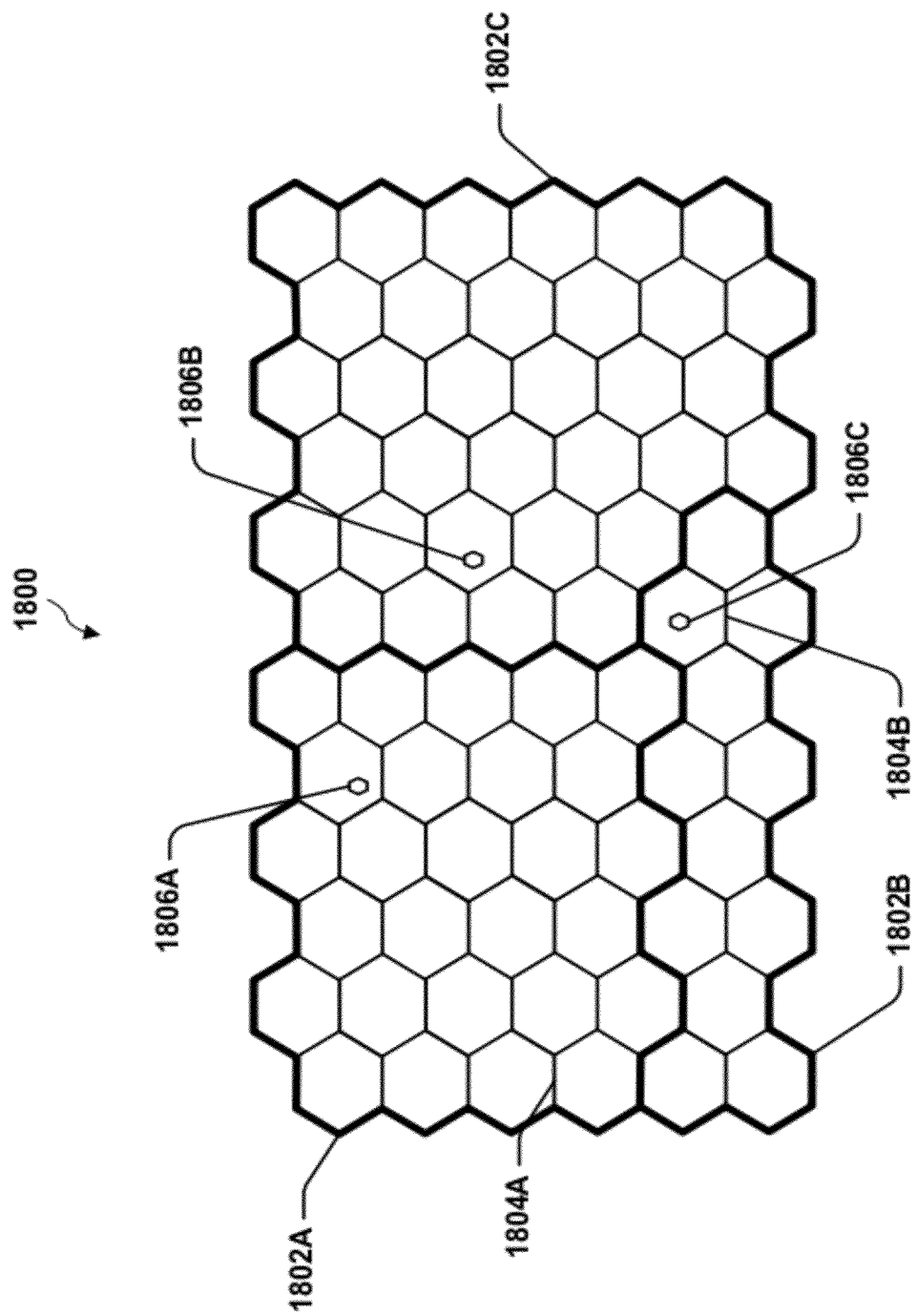
FIG. 18 illustrates an example of a coverage map having several defined tracking areas.

FIG. 18 illustrates an example of a coverage map 1800 where several tracking areas 1802 (or routing areas or location areas) are defined, each of which includes several macro coverage areas 1804. Here, areas of coverage associated with tracking areas 1802A, 1802B, and 1802C are delineated by the wide lines and the macro coverage areas 1804 are represented by the hexagons. The tracking areas 1802 also include femto coverage areas 1806. In this example, each of the femto coverage areas 1806 (e.g., femto coverage area 1806C) is depicted within a macro coverage area 1804 (e.g., macro coverage area 1804B). It should be appreciated, however, that a femto coverage area 1806 may not lie entirely within a macro coverage area 1804. In practice, a large number of femto coverage areas 1806 can be defined with a given tracking area 1802 or macro coverage area 1804. Also, one or more pico coverage areas (not shown) can be defined within a given tracking area 1802 or macro coverage area 1804.

Referring again to FIG. 17, the owner of a femto node 1710 can subscribe to mobile service, such as, for example, 3G mobile service, offered through the mobile operator core network 1750. In addition, an access terminal 1720 can be capable of operating both in macro environments and in smaller scale (e.g., residential) network environments. Thus, for example, depending on the current location of the access terminal 1720, the access terminal 1720 can be served by an access node 1760 or by any one of a set of femto nodes 1710 (e.g., the femto nodes 1710A and 1710B that reside within a corresponding user residence 1730). For example, when a subscriber is outside his home, he is served by a standard macro cell access node (e.g., node 1760) and when the subscriber is at home, he is served by a femto node (e.g., node 1710A). Here, it should be appreciated that a femto node 1710 can be backward compatible with existing access terminals 1720.

A femto node 1710 can be deployed on a single frequency or, in the alternative, on multiple frequencies. Depending on the particular configuration, the single frequency or one or more of the multiple frequencies can overlap with one or more frequencies used by a macro cell access node (e.g., node 1760). In some aspects, an access terminal 1720 can be configured to connect to a preferred femto node (e.g., the home femto node of the access terminal 1720) whenever such connectivity is possible. For example, whenever the access terminal 1720 is within the user's residence 1730, it can communicate with the home femto node 1710.

In some aspects, if the access terminal 1720 operates within the mobile operator core network 1750 but is not residing on its most preferred network (e.g., as defined in a preferred roaming list), the access terminal 1720 can continue to search for the most preferred network (e.g., femto node 1710) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1720 can limit the search for specific band and channel. For example, the search for the most preferred system can be repeated periodically. Upon discovery of a preferred femto node, such as femto node 1710, the access terminal 1720 selects the femto node 1710 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1710 that reside within the corresponding user residence 1730). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for facilitating in-band closed subscriber group (CSG) provisioning, comprising:
   receiving a request from a device to establish a packet data context for an access point name;
   determining that the device is requesting in-band CSG provisioning based on the request, wherein in-band CSG provisioning enables at least a temporary connection between the device and an access point associated with the access point name for initiating registration with the access point where such access would otherwise be restricted;
   selecting a gateway for establishing the packet data context based at least in part on the access point name, wherein the selecting the gateway comprises obtaining an internet protocol (IP) address of the gateway related to the access point name based at least in part on performing a domain name server (DNS) query for the gateway with a DNS server; and
   sending a session request message to the gateway to establish the packet data context for the device, wherein the session request message includes an identifier that indicates the session request message is for in-band CSG provisioning.

2. The method of claim 1, wherein the determining that the device is requesting in-band CSG provisioning is based at least in part on an indication included in the request.

3. The method of claim 1, wherein the determining that the device is requesting in-band CSG provisioning is based at least in part on determining the access point name is associated with the in-band CSG provisioning.

4. The method of claim 1, wherein the session request message comprises either a create packet data protocol context request message employed to establish the packet data context as a packet data protocol context, or a create session request message employed to establish the packet data context as a packet data network connection.

5. The method of claim 1, further comprising deactivating access to one or more different gateways other than the gateway based at least in part on the receiving the request from the device.

6. The method of claim 1, further comprising indicating to the gateway that the device is being provisioned at a CSG to control traffic allowed at the gateway.

7. The method of claim 1, further comprising receiving a response message from the gateway indicating establishment of the packet data context.

8. The method of claim 7, further comprising:
   establishing a tunnel between the gateway and a CSG access point for the device based at least in part on the request; and
   associating the packet data context with the tunnel.

9. The method of claim 1, further comprising receiving subscription data related to updating a subscription of the device to include the CSG from a home subscriber server or home location register of the device.

10. The method of claim 9, further comprising deactivating the packet data context based at least in part on the receiving the subscription data.

11. An apparatus for facilitating in-band closed subscriber group (CSG) provisioning, comprising:
    at least one processor configured to:
      receive a request from a device to establish a packet data context for an access point name;
      determine that the device is requesting in-band CSG provisioning based on the request, wherein in-band CSG provisioning enables at least a temporary connection between the device and an access point associated with the access point name for initiating registration with the access point where such access would otherwise be restricted;
      select a gateway for establishing the packet data context based at least in part on the access point name, wherein the at least one processor is configured to select the gateway based at least in part on obtaining an internet protocol (IP) address of the gateway related to the access point name based at least in part on performing a domain name server (DNS) query for the gateway with a DNS server; and
      send a session request message to the gateway to establish the packet data context for the device, wherein the session request message includes an identifier that indicates the session request message is for in-band CSG provisioning; and
    a memory coupled to the at least one processor.

12. The apparatus of claim 11, wherein the at least one processor determines the device is requesting in-band CSG provisioning based at least in part on an indication included in the request.

13. The apparatus of claim 11, wherein the at least one processor determines the device is requesting in-band CSG provisioning based at least in part on determining that the access point name is associated with the in-band CSG provisioning.

14. The apparatus of claim 11, wherein the session request message comprises a create packet data protocol context request message employed to establish the packet data context as a packet data protocol context, or a create session request message employed to establish the packet data context as a packet data network connection.

15. The apparatus of claim 11, wherein the at least one processor is further configured to deactivate access to one or more different gateways other than the gateway based at least in part on the request.

16. The apparatus of claim 11, wherein the at least one processor is further configured to indicate to the gateway that the device is being provisioned at a CSG to control traffic allowed at the gateway.

17. The apparatus of claim 11, wherein the at least one processor is further configured to receive a response message from the gateway indicating establishment of the packet data context.

18. The apparatus of claim 17, wherein the at least one processor is further configured to:
establish a tunnel between the gateway and a CSG access point for the device based at least in part on the request; and
associate the packet data context with the tunnel.

19. The apparatus of claim 11, wherein the at least one processor is further configured to receive subscription data related to updating a subscription of the device to include the CSG from a home subscriber server or home location register of the device.

20. The apparatus of claim 19, wherein the at least one processor is further configured to deactivate the packet data context based at least in part on the receiving the subscription data.

21. An apparatus for facilitating in-band closed subscriber group (CSG) provisioning, comprising:
means for determining that the device is requesting in-band CSG provisioning based on a request from the device to establish a packet data context for an access point name, wherein in-band CSG provisioning enables at least a temporary connection between the device and an access point associated with the access point name for initiating registration with the access point where such access would otherwise be restricted;
means for selecting a gateway for establishing the packet data context based at least in part on the access point name, wherein the means for selecting the gateway obtains an internet protocol (IP) address of the gateway related to the access point name based at least in part on performing a domain name server (DNS) query for the gateway with a DNS server; and
means for sending a session request message to the gateway to establish the packet data context for the device, wherein the session request message includes an identifier that indicates the session request message is for in-band CSG provisioning.

22. The apparatus of claim 21, wherein the means for determining determines that the device is requesting in-band CSG provisioning based at least in part on an indication included in the request.

23. The apparatus of claim 21, wherein the means for determining determines that the device is requesting in-band CSG provisioning based at least in part on determining the access point name is associated with the in-band CSG provisioning.

24. The apparatus of claim 21, wherein the session request message comprises a create packet data protocol context request message employed to establish the packet data context as a packet data protocol context, or a create session request message employed to establish the packet data context as a packet data network connection.

25. The apparatus of claim 21, wherein the means for selecting the gateway deactivates access to one or more different gateways other than the gateway based at least in part on the receiving the request from the device.

26. The apparatus of claim 21, wherein the means for sending the session request message indicates to the gateway that the device is being provisioned at a CSG to control traffic allowed at the gateway.

27. The apparatus of claim 21, wherein the means for sending the session request message receives a response message from the gateway indicating establishment of the packet data context.

28. The apparatus of claim 27, wherein the means for sending the session request message establishes a tunnel between the gateway and a CSG access point for the device based at least in part on the request and associates the packet data context with the tunnel.

29. The apparatus of claim 21, further comprising means for receiving subscription data related to updating a subscription of the device to include the CSG from a home subscriber server or home location register of the device.

30. The apparatus of claim 29, wherein the means for sending the session request message deactivates the packet data context based at least in part on the means for receiving subscription data receiving the subscription data.

31. A computer program product for facilitating in-band closed subscriber group (CSG) provisioning, comprising:
a non-transitory computer-readable medium, comprising:
code for causing at least one computer to receive a request from a device to establish a packet data context for an access point name;
code for causing the at least one computer to determine that the device is requesting in-band CSG provisioning based on the request, wherein in-band CSG provisioning enables at least a temporary connection between the device and an access point associated with the access point name for initiating registration with the access point where such access would otherwise be restricted;
code for causing the at least one computer to select a gateway for establishing the packet data context based at least in part on the access point name, wherein the code for causing the at least one computer to select selects the gateway based at least in part on obtaining an internet protocol (IP) address of the gateway related to the access point name based at least in part on performing a domain name server (DNS) query for the gateway with a DNS server; and
code for causing the at least one computer to send a session request message to the gateway to establish the packet data context for the device, wherein the session request message includes an identifier that indicates the session request message is for in-band CSG provisioning.

32. The computer program product of claim 31, wherein the code for causing the at least one computer to determine determines the device is requesting in-band CSG provisioning based at least in part on an indication included in the request.

33. The computer program product of claim 31, wherein the code for causing the at least one computer to determine determines the device is requesting in-band CSG provisioning based at least in part on determining that the access point name is associated with the in-band CSG provisioning.

34. The computer program product of claim 31, wherein the session request message comprises a create packet data protocol context request message employed to establish the packet data context as a packet data protocol context, or a create session request message employed to establish the packet data context as a packet data network connection.

35. The computer program product of claim 31, wherein the computer-readable medium further comprises code for causing the at least one computer to deactivate access to one or more different gateways other than the gateway based at least in part on the request.

36. The computer program product of claim 31, wherein the computer-readable medium further comprises code for causing the at least one computer to indicate to the gateway that the device is being provisioned at a CSG to control traffic allowed at the gateway.

37. The computer program product of claim 31, wherein the computer-readable medium further comprises code for causing the at least one computer to receive a response message from the gateway indicating establishment of the packet data context.

38. The computer program product of claim 37, wherein the computer-readable medium further comprises:
code for causing the at least one computer to establish a tunnel between the gateway and a CSG access point for the device based at least in part on the request; and
code for causing the at least one computer to associate the packet data context with the tunnel.

39. The computer program product of claim 31, wherein the computer-readable medium further comprises code for causing the at least one computer to receive subscription data related to updating a subscription of the device to include the CSG from a home subscriber server or home location register of the device.

40. The computer program product of claim 39, wherein the computer-readable medium further comprises code for causing the at least one computer to deactivate the packet data context based at least in part on the receiving the subscription data.

41. An apparatus for facilitating in-band closed subscriber group (CSG) provisioning, comprising:
a provisioning support indicating component for determining that the device is requesting in-band CSG provisioning based on a request from the device to establish a packet data context for an access point name, wherein in-band CSG provisioning enables at least a temporary connection between the device and an access point associated with the access point name for initiating registration with the access point where such access would otherwise be restricted;
a gateway selecting component for selecting a gateway for establishing the packet data context based at least in part on the access point name, wherein the gateway selecting component obtains an internet protocol (IP) address of the gateway related to the access point name based at least in part on performing a domain name server (DNS) query for the gateway with a DNS server; and
a packet data context establishing component for sending a session request message to the gateway to establish the packet data context for the device, wherein the session request message includes an identifier that indicates the session request message is for in-band CSG provisioning.

42. The apparatus of claim 41, wherein the provisioning support indicating component determines that the device is requesting in-band CSG provisioning based at least in part on an indication included in the request.

43. The apparatus of claim 41, wherein the provisioning support indicating component determines that the device is requesting in-band CSG provisioning based at least in part on determining the access point name is associated with the in-band CSG provisioning.

44. The apparatus of claim 41, wherein the session request message comprises a create packet data protocol context request message employed to establish the packet data context as a packet data protocol context, or a create session request message employed to establish the packet data context as a packet data network connection.

45. The apparatus of claim 41, wherein the gateway selecting component deactivates access to one or more different gateways other than the gateway based at least in part on the receiving the request from the device.

46. The apparatus of claim 41, wherein the packet data context establishing component indicates to the gateway that the device is being provisioned at a CSG to control traffic allowed at the gateway.

47. The apparatus of claim 41, wherein the packet data context establishing component receives a response message from the gateway indicating establishment of the packet data context.

48. The apparatus of claim 47, wherein the packet data context establishing component establishes a tunnel between the gateway and a CSG access point for the device based at least in part on the request and associates the packet data context with the tunnel.

49. The apparatus of claim 41, further comprising a CSG subscription component for receiving subscription data related to updating a subscription of the device to include the CSG from a home subscriber server or home location register of the device.

50. The apparatus of claim 49, wherein the packet data context establishing component deactivates the packet data context based at least in part on the means for receiving subscription data receiving the subscription data.

* * * * *